(12) United States Patent
Tonelli

(10) Patent No.: US 12,213,571 B2
(45) Date of Patent: Feb. 4, 2025

(54) PORTABLE CONTAINER

(71) Applicant: G.T. LINE—S.R.L., Crespellano (IT)

(72) Inventor: Massimo Tonelli, Bologna (IT)

(73) Assignee: G.T. LINE—S.R.L., Frazione Crespellano (IT)

( * ) Notice: Subject to any disclaimer, the term of this patent is extended or adjusted under 35 U.S.C. 154(b) by 650 days.

(21) Appl. No.: 17/312,640

(22) PCT Filed: Dec. 5, 2019

(86) PCT No.: PCT/EP2019/083853
§ 371 (c)(1),
(2) Date: Jun. 10, 2021

(87) PCT Pub. No.: WO2020/120285
PCT Pub. Date: Jun. 18, 2020

(65) Prior Publication Data
US 2021/0321736 A1 Oct. 21, 2021

(30) Foreign Application Priority Data
Dec. 12, 2018 (IT) .......................... 102018000010999

(51) Int. Cl.
*A45C 13/42* (2006.01)
*A45C 5/03* (2006.01)
(Continued)

(52) U.S. Cl.
CPC ................ *A45C 13/42* (2013.01); *A45C 5/03* (2013.01); *A45C 13/26* (2013.01); *A45C 2005/037* (2013.01); *G06K 19/0776* (2013.01)

(58) Field of Classification Search
CPC ........... A45C 13/42; A45C 5/03; A45C 13/26; A45C 2005/037; G06K 19/0776
See application file for complete search history.

(56) References Cited

U.S. PATENT DOCUMENTS 4,236,559 A * 12/1980 Archbold ................. A45C 3/00
190/902
4,663,802 A * 5/1987 Kunzler ................. A45C 13/26
16/259
(Continued)

FOREIGN PATENT DOCUMENTS

CN 103942592 A 7/2014
CN 103946872 A 7/2014
(Continued)

OTHER PUBLICATIONS

International Search Report issued Jan. 14, 2020 re: Application No. PCT/EP2019/083853, pp. 1-3.
(Continued)

*Primary Examiner* — David R Dunn
*Assistant Examiner* — Christopher E Veraa
(74) *Attorney, Agent, or Firm* — CANTOR COLBURN LLP

(57) ABSTRACT

A portable container, such as a suitcase, trunk, case, trolley, and the like, including an outer shell for delimiting at least one compartment for accommodating personal items, instruments, tools, objects in general, and at least one electronic tag configured to store data of various kinds and/or transmit them via a contactless information transmission technology, such as RFID, NFC and similar technologies. The container includes a supporting plate which is anchored permanently to an external surface region of the shell; an at least partially transparent plaque is arranged on a first face of the plate, on the opposite side with respect to the surface region, by interlocking in a parallel and detachable manner, for the definition of a pocket configured to receive identification elements, such as tags, cards or the like.

12 Claims, 20 Drawing Sheets

(51) Int. Cl.
*A45C 13/26* (2006.01)
*G06K 19/077* (2006.01)

(56) References Cited

U.S. PATENT DOCUMENTS

| | | | | |
|---|---|---|---|---|
| 5,366,249 | A * | 11/1994 | Diemert | G09F 3/0288 |
| | | | | 40/6 |
| 6,050,622 | A * | 4/2000 | Gustafson | G06K 19/07758 |
| | | | | 70/57.1 |
| 8,052,061 | B2 * | 11/2011 | Warther | G06K 19/06187 |
| | | | | 235/487 |
| 8,282,011 | B1 * | 10/2012 | Skoine | G06K 19/0776 |
| | | | | 235/487 |
| 9,877,296 | B2 * | 1/2018 | Kelly | G06K 19/025 |
| 10,370,873 | B2 * | 8/2019 | McIntosh | E05B 67/383 |
| 2005/0108912 | A1 * | 5/2005 | Bekker | G09F 3/005 |
| | | | | 40/633 |
| 2007/0022647 | A1 * | 2/2007 | Miller | B32B 27/08 |
| | | | | 40/654.01 |
| 2014/0291405 | A1 * | 10/2014 | Harkes | G06K 19/07749 |
| | | | | 235/492 |
| 2015/0108222 | A1 * | 4/2015 | Shimizu | G06K 19/07771 |
| | | | | 235/488 |
| 2015/0122893 | A1 * | 5/2015 | Warther | G06K 19/14 |
| | | | | 235/492 |
| 2015/0280788 | A1 * | 10/2015 | Ryu | G09F 9/372 |
| | | | | 455/41.1 |
| 2016/0183653 | A1 * | 6/2016 | Warther | G06K 19/07726 |
| | | | | 340/10.51 |
| 2016/0197323 | A1 * | 7/2016 | DeKeuster | H01M 10/647 |
| | | | | 429/82 |
| 2016/0227897 | A1 * | 8/2016 | Jobling | G09F 3/0297 |
| 2017/0103292 | A1 * | 4/2017 | Reh | G06K 19/06112 |
| 2017/0156462 | A1 * | 6/2017 | Yu | A45C 13/1069 |
| 2018/0039878 | A1 * | 2/2018 | Akamatsu | G06K 19/077 |

FOREIGN PATENT DOCUMENTS

| | | |
|---|---|---|
| CN | 107430718 A | 12/2017 |
| CN | 107708472 A | 2/2018 |
| JP | 3212050 U | 8/2017 |

OTHER PUBLICATIONS

Written opinion issued Jan. 14, 2020 re: Application No. PCT/EP2019/083853, pp. 1-5.

Chinese Office Action for Chinese Application No. 201980082344.2, dated Feb. 15, 2023, 10 pages.

* cited by examiner

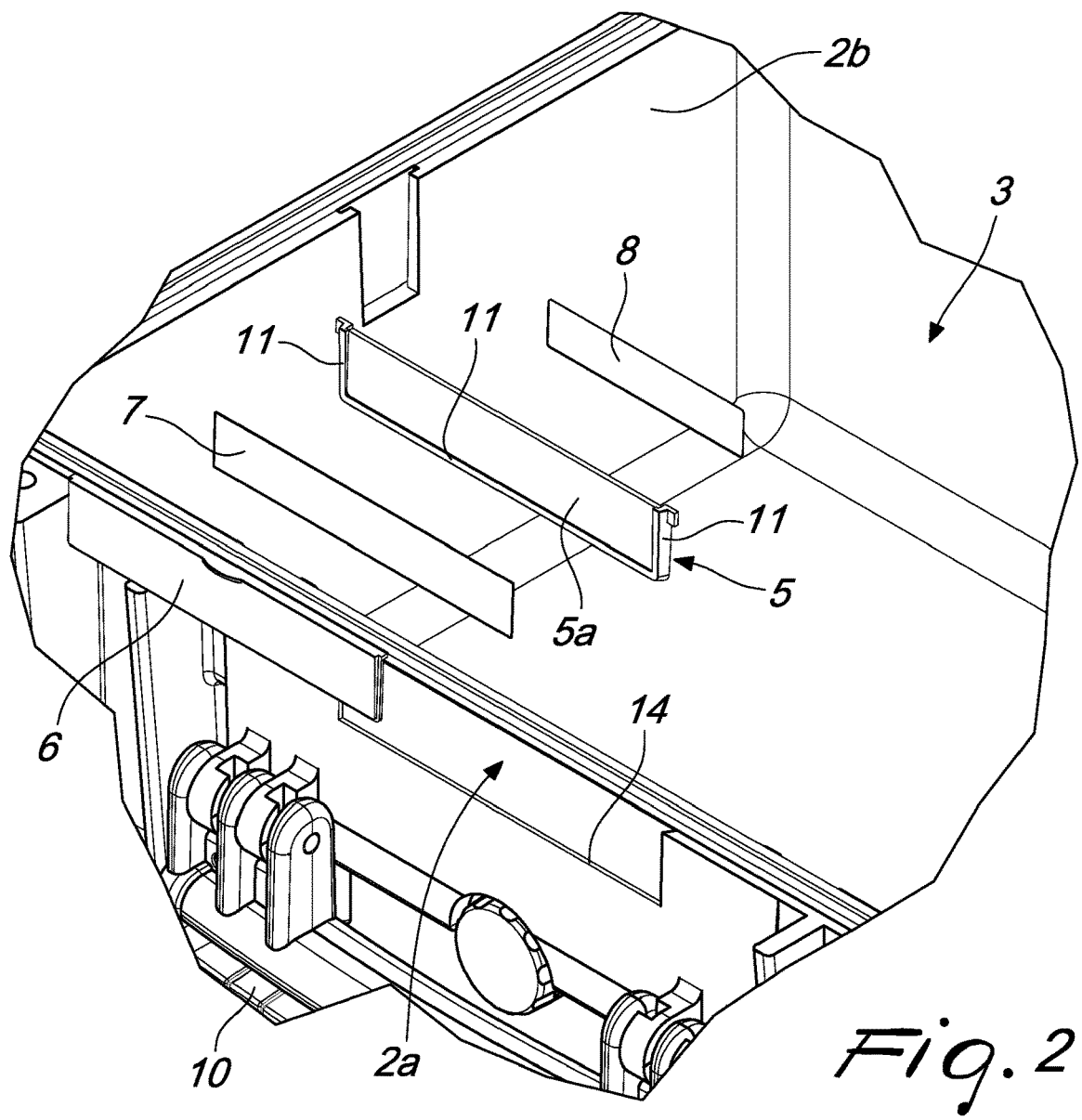
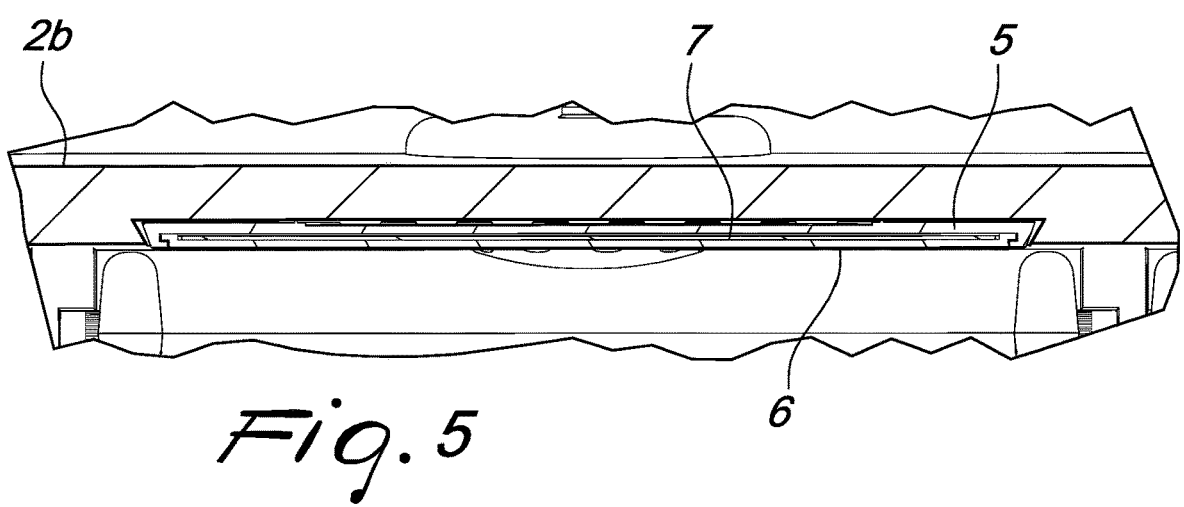

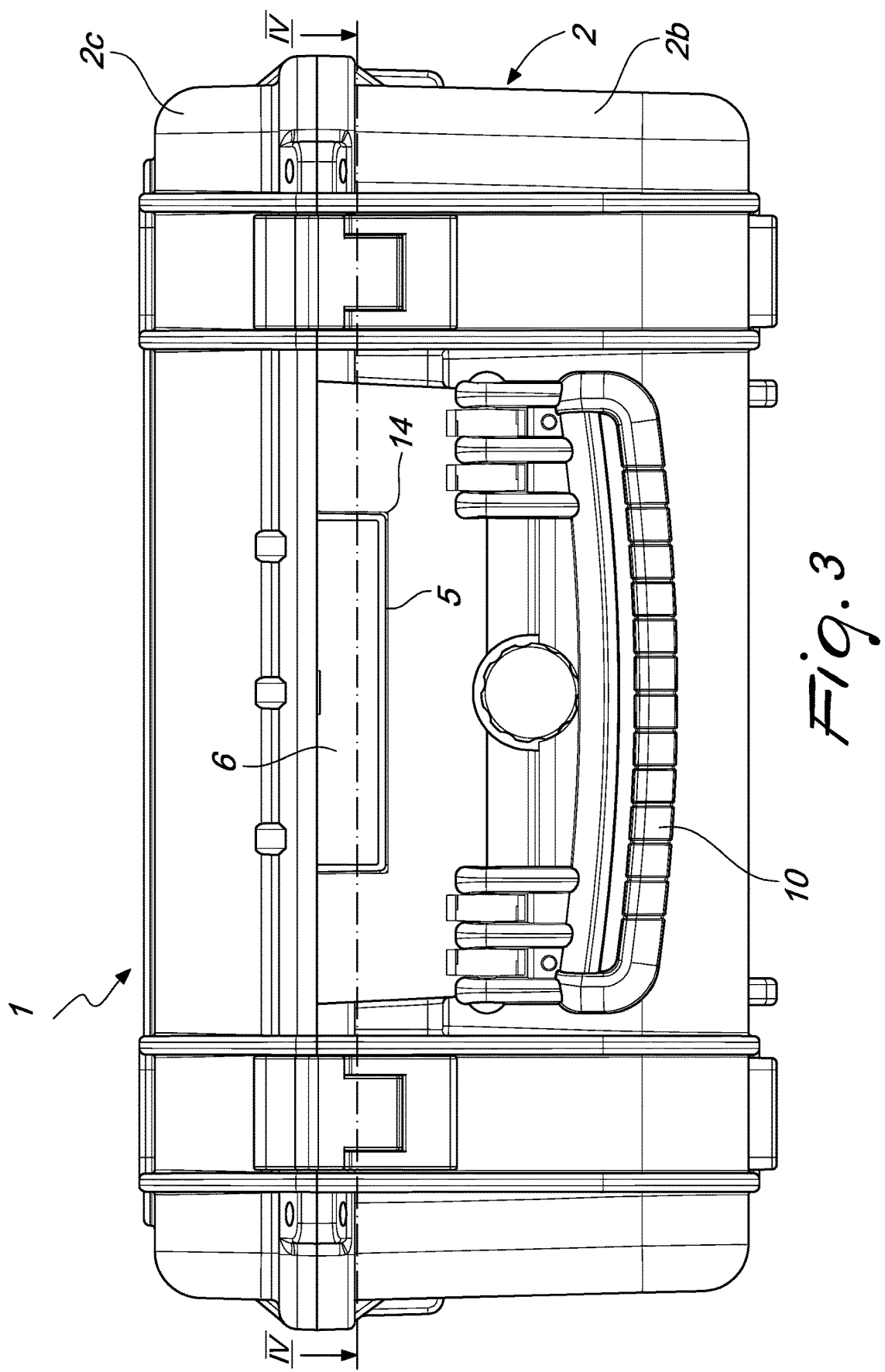

PORTABLE CONTAINER

TECHNICAL FIELD

The present disclosure relates to a portable container.

BACKGROUND

The broad product category of portable containers includes trunks, cases, suitcases, trolleys, rucksacks and other products, which are differentiated in terms of shape, dimensions, materials and/or functionality, as well as for their intended use, the type of goods that can be transported and/or the customers of reference.

Over time in fact, the manufacturing companies have progressively diversified their offer, in order to satisfy the needs of increasingly heterogeneous, aware and demanding customers.

For example, both in the professional field and in private contexts, trunks or suitcases are known which distinguish themselves not only for simple aesthetic and design choices but also for the mechanical properties (impact resistance, lightness, selection of materials, etcetera), for the wealth of accessories and equipment, for the methods of organizing the internal compartment (or internal compartments), or for additional particular functionalities. Among the latter, some manufacturing companies have recently started to market containers provided with an electronic tag (or label, or transponder), in which it is possible to store various items of information of interest, related for example to the container itself and/or to what is accommodated in it.

The tag can thus be queried by a dedicated reader, via a contactless information transmission technology, such as for example RFID technology or NFC technology, indeed to provide this information to third parties (without having to open the container or interact otherwise therewith).

Clearly, these solutions have multiple functionalities, currently only partially explored and certainly destined to be very interesting and appealing for the public now and in the near future, in view for example of the increasing digitalization of information and the rapid evolution of the "Internet of things", which indeed concerns the possibility of giving ordinary objects an active role, in the interaction with the surrounding environment and with people, also by resorting to RFID/NFC tags fitted on said objects.

In this context, however, the functionalities that one wishes to obtain with such tags create new problems to container manufacturing companies, which sometimes are not easy to solve.

One of these problems is represented by the determination of the optimum placement of the tag, with respect to the container with which it has to be associated.

In fact, a good placement must allow easy interaction with the respective reader, be it installed in a fixed station or, vice versa, a portable device. At the same time, the tag must be suitably protected from unwanted accesses, in order to prevent or in any case discourage malicious third parties who want to tamper with it or to acquire/modify its data and information.

These requirements are often difficult to reconcile, and this indeed generates problems and drawbacks that until now manufacturing companies have solved in a not entirely satisfactory manner.

It should be noted, moreover, that the placement selected for the tag must not complicate significantly the process of manufacturing the containers (of a new generation or existing) and must not require alterations to the layout and design of said containers (and of the corresponding accessories), because this would increase in an unwanted manner the overall cost (making the new offered functionalities very unappealing) and would require modifications to molds and other production systems, in a manner that in any case would not be appreciated.

SUMMARY

The aim of the present disclosure is to solve the problems described above, providing a portable container in which the electronic tag has a suitable placement.

Within this aim, the disclosure provides a portable container in which the placement selected for the electronic tag allows its easy interaction with external readers.

The disclosure also provides a portable container in which the placement selected for the electronic tag discourages attempts at tampering and therefore ensures suitable protection thereof.

The disclosure further provides a portable container in which the placement selected for the electronic tag allows its easy assembly, even applying simple modifications to systems and processes for manufacturing existing or already marketed containers.

The disclosure provides a portable container that ensures high reliability in operation.

The disclosure proposes a portable container that adopts a technical and structural architecture that is alternative to those of portable containers of the known type.

The disclosure also provides a portable container that can be obtained easily starting from commonly commercially available elements and materials.

The disclosure further provides a portable container that has modest costs and is safe in application.

This aim and these and other advantages which will become better apparent hereinafter are achieved by providing a portable container according to claim 1.

BRIEF DESCRIPTION OF THE DRAWINGS

Further characteristics and advantages of the disclosure will become better apparent from the description of some preferred but not exclusive embodiments of the portable container according to the disclosure, illustrated by way of non-limiting example in the accompanying drawings, wherein:

FIGS. 1 to 11 are views of the portable container according to the disclosure in a first embodiment, more particularly:

FIG. 1 is a perspective front lateral and partially exploded view of the portable container according to the disclosure in a first arrangement;

FIG. 2 is a highly enlarged-scale view of a detail of FIG. 1;

FIG. 3 is a front view of the container of FIG. 1 in a second arrangement;

FIG. 4 is a sectional view of FIG. 3, taken along the plane IV-IV;

FIG. 5 is a highly enlarged-scale view of a detail of FIG. 4;

FIGS. 6 and 7 are perspective front lateral and rear lateral views, respectively, of an assembly comprising the plate, the tags, the plaque and the identification element;

FIG. 8 is an exploded view of the assembly of FIG. 6;

FIGS. 9 and 10 are perspective front lateral and rear lateral views, respectively, of a constructive variation of the assembly of FIG. 6;

FIG. 11 is an exploded view of the assembly of FIG. 9;

FIG. 12 is a perspective front lateral and partially exploded view of the portable container according to the disclosure;

FIG. 13 is a highly enlarged-scale view of a detail of FIG. 12;

FIG. 14 is a view from another angle of substantially the same detail of FIG. 13;

FIGS. 15 and 16 are perspective front lateral and rear lateral views, respectively, of an assembly comprising the plate, the tags, the plaque and the identification element;

FIGS. 17 and 18 are exploded views of the assembly of FIGS. 15 and 16, respectively;

FIG. 19 is a perspective front lateral and partially exploded view of the portable container according to the disclosure;

FIG. 20 is a highly enlarged-scale view of a detail of FIG. 19;

FIG. 21 is a view from another angle of substantially the same detail of FIG. 20;

FIGS. 22 and 23 are perspective front lateral and rear lateral views, respectively, of an assembly comprising the plate, the tags, the plaque and the identification element;

FIGS. 24 and 25 are exploded views of the assembly of FIGS. 22 and 23, respectively;

FIG. 26 is a perspective front lateral and partially exploded view of the portable container according to the disclosure;

FIG. 27 is a highly enlarged-scale view of a detail of FIG. 26;

FIG. 28 is a view from another angle of substantially the same detail of FIG. 27;

FIGS. 29 and 30 are perspective front lateral and rear lateral views, respectively, of an assembly comprising the plate, the tags, the plaque and the identification element, respectively; and FIGS. 31 and 32 are exploded views of the assembly of FIGS. 29 and 30, respectively.

DETAILED DESCRIPTION OF THE DRAWINGS

Figure 1:
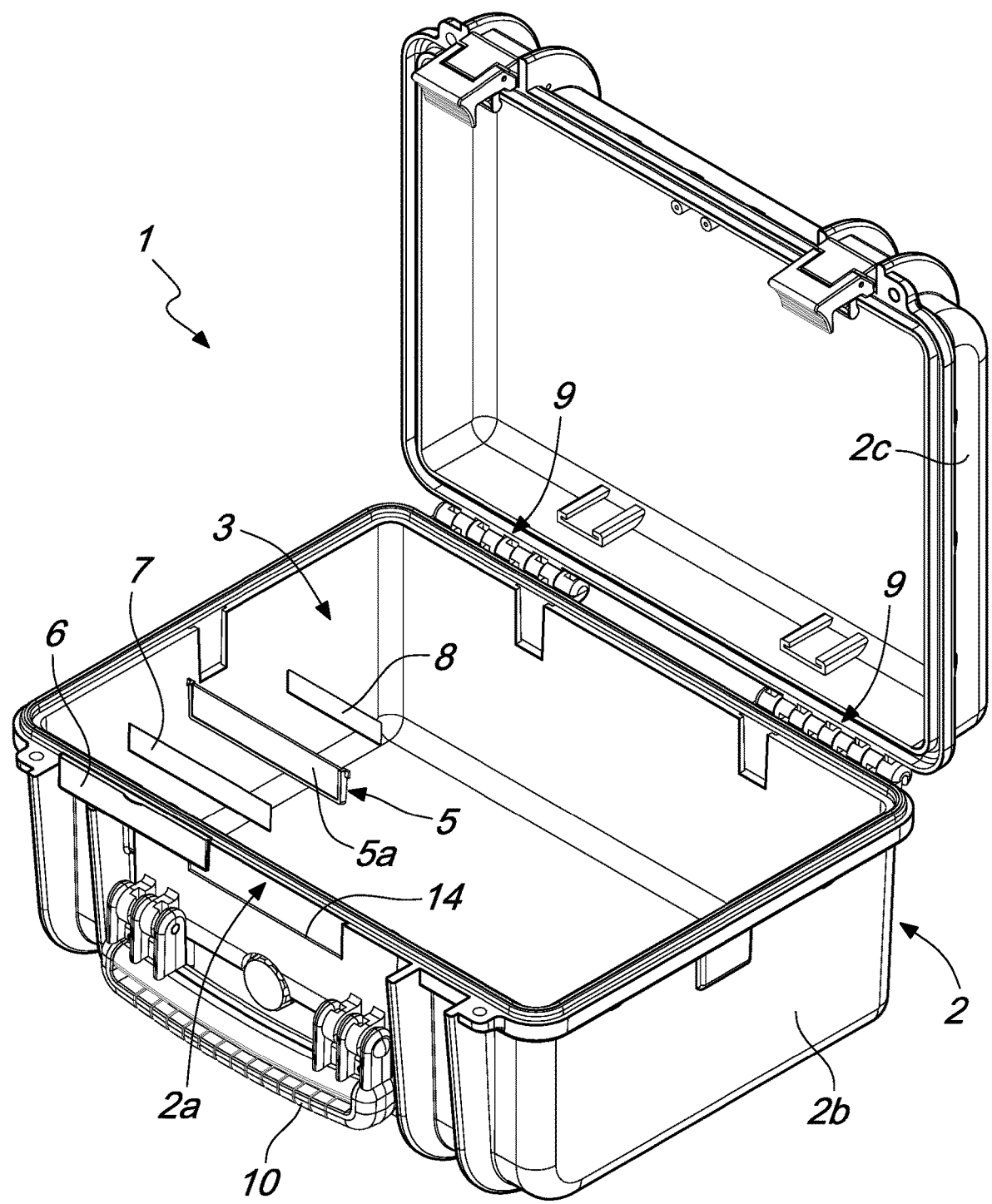

With particular reference to the figures, the reference numeral 1 generally designates a portable container, of the type of a suitcase, trunk, crate, trolley, and the like.

The container 1 comprises an outer shell 2 for delimiting at least one compartment 3 for accommodating personal items, tools, equipment, objects in general. It is specified, in this regard and right now, that any further reference to containers 1 that will be made in the present description is to be understood as being extended to any type of product (suitcase, trunk, crate, trolley, rucksack, sack, bag, etcetera), capable of accommodating in the compartment 3 and carrying objects and tools of various kinds, both for private use and for professional use.

Without abandoning the protective scope claimed herein, in the container 1 it is in fact possible to accommodate tools, instruments, gear, electronic equipment or others, in professional use, as well as clothes, objects of various kinds and personal items, in private use.

In any case, in the preferred application and in the various embodiments illustrated in the accompanying figures, the container 1 is a kind of rigid suitcase (or trunk), for mainly professional use, made of polymeric material with high impact resistance and provided with suitable solutions that ensure its complete tightness and therefore its capacity to prevent the entry of water, humidity, dust and contaminants in general. In any case, it is noted once again that the protective scope claimed herein is not limited to this preferred application and must instead be considered as extended also to other types of container 1, whether rigid or not, made of any material and intended for any user.

The container 1 comprises furthermore at least one electronic tag 4a, 4b (or label, or transponder), configured to store data of various kinds and/or transmit them via a contactless information transmission technology, such as RFID, NFC and similar technologies.

The electronic tag 4a, 4b can thus store (according to per se known methods) information of any kind, such as for example the identification code of the container 1, its content, data related to the manufacturing site and cycle, traceability, etcetera, as a function of the specific requirements and functionalities that one wishes to give to the container 1, by utilizing the almost infinite possibilities offered by RFID, NFC, or similar technologies. In fact, these technologies allow a reader or other designated electronic device to acquire this information in digital format and to use it in various manners. Via the reader, or in any case another external device, there is also the possibility to rewrite or extend the information contained in the electronic tag 4a, 4b, even after the production and marketing of the container 1.

The electronic tag 4a, 4b with which the container 1 is provided can also be provided with a write mode, in addition to a read mode, and therefore it can transmit and store information on an associated device.

According to the disclosure, the portable container 1 comprises a supporting plate 5 which is anchored permanently to an external surface region 2a of the shell 2. The surface region 2a can be any portion of the outer surface of the shell 2: in the pages that follow, in any case, some possible practical choices of considerable interest will be shown by way of non-limiting example. The plate 5 can be made for example of polypropylene (also designated by the acronym "PP" in the technology of the field), although the possibility to make it of other materials, be they polymeric or not, is not excluded. It should also be stressed that the shell 2 can be (substantially) constituted by a single material (polymeric or metallic, made of aluminum, for example) or, at least for a part thereof, by a combination of multiple layers of different materials (for example indeed a polymeric layer and one constituted by a profiled element made of aluminum or other metal in order to increase stiffness). In this last case, the surface region 2a can be formed on any one of said layers.

An at least partially transparent plaque 6 is interlocked in a parallel and detachable manner on a first face 5a of the plate 5, on the opposite side with respect to the surface region 2a (the first face 5a is the one facing outward). Preferably, in any case, the plaque 6 is completely transparent; it can be for example made of polycarbonate (also designated by the acronym "PC" in the technology of the field), although the possibility to make it of other materials, be they polymeric or not, is not excluded.

Thus, between the plaque 6 and the plate 5 there is a pocket (even of few tenths of a millimeter, for example) configured to receive identification elements 7 of the type of labels (made of PVC, paper, etcetera), cards or the like. In other words, the identification element 7 (which can be simply constituted by a piece of paper or cardboard) is sandwiched between the first face 5a of the plate 5 and the plaque 6, and by virtue of the choice to make the plaque 6 of at least partially transparent material, it is possible to read from outside lettering or text applied thereon, such as for example the name of the owner or an address where the owner is reachable (useful in case of loss of the container 1).

The electronic tag 4a, 4b is fixed stably (directly or indirectly) on a second face 5b of the plate 5; said second face 5b is opposite with respect to the first face 5a and is applied stably to the surface region 2a of the shell 2.

The particular placement chosen obtains the double goal that is the aim of the disclosure. First of all, in fact, the tag 4a, 4b is fixed on a plate 5 arranged outside the shell 2 (on the surface region 2a) and thus the designated reader (or other electronic device) can be easily moved closer to said tag 4a, 4b, ensuring optimum interaction.

At the same time, the tag 4a, 4b is kept substantially inaccessible, since it is interposed between the surface region 2a and the plate 5: contact with it is possible only by breaking or removing the plate 5, in any case damaging the container 1 in a severe and evident manner. This discourages attempts at tampering or unwanted access (which are complicated and in any case easily identifiable subsequently), ensuring suitable protection to the tag 4a, 4b.

In particular, in the preferred embodiment, which in any case does not limit the application of the disclosure, the container 1 comprises a first electronic tag 4a, of the RFID type, and a second electronic tag 4b, of the NFC type, so as to be able to use the potentials offered by both corresponding technologies, and thus increase the versatility, the appeal and the functionalities of the disclosure. Although the possibility to fix each tag 4a, 4b to the second face 5b in another manner (direct or indirect) is not excluded, in the solution proposed in the accompanying figures they are both fixed stably on an adhesive sheet 8 applied to the second face 5b of the plate 5. The tags 4a, 4b are thus interposed between the sheet 8 and the surface region 2a of the shell 2. Obviously, in other embodiments according to the disclosure, even just one tag 4a, 4b may be fixed to the sheet 8.

The container 1 according to the disclosure can be provided and/or marketed without the identification element 7: in this case, the user may, if he so wishes, obtain it separately and introduce it autonomously between the plate 5 and the plaque 6, in the pocket delimited by them.

In the preferred application, instead, the container 1 according to the disclosure comprises the identification element 7, preprinted and/or (subsequently) writable by hand (or in another manner). The identification element 7 is thus inserted removably in the pocket, between the first face 5a of the plate 5 and the plaque 6.

As mentioned, the protective scope claimed herein extends to any type of container 1: in the preferred embodiment, in any case, as well as in the exemplifying solutions shown in the accompanying figures, the shell 2 of the container 1 comprises a first half-shell 2b and a second half-shell 2c having a substantially box-like open configuration. In this respect, it is appropriate to stress that in the present description and in the accompanying figures the identification of the first half-shell 2b (and therefore of the second half-shell 2c) is completely arbitrary, since each one of them can be identified as "first" (or "second"), without thereby abandoning the protective scope claimed herein. In the accompanying figures, the lower half-shell has been identified as first half-shell 2b, but the other upper one might also be defined in the same way. Moreover, it is specified that the half-shells 2b, 2c can constitute the two halves of the shell 2 (of equal dimensions and shape), or can have shapes and dimensions (in particular height) that are mutually different, for example with a higher first half-shell 2b and with the second half-shell 2c acting as a lid.

With further reference to the preferred embodiment, in any case, the half-shells 2b, 2c are mutually articulated about at least one hinge 9 arranged proximate to a common edge. By virtue indeed of the articulation ensured by the hinge 9 (or by multiple aligned hinges 9), the half-shells 2b, 2c are mutually movable between at least one configuration for free access to the compartment 3 and a configuration for the closure thereof. In the closure configuration, the respective free edges of the half-shells 2b, 2c are fully superimposed (and in contact), while in the open configuration only the respective portions of the edges proximate to the hinge 9 are kept superimposed. The external surface region 2a is thus formed on one of the half-shells 2b, 2c, proximate to one of the edges (on any wall).

In greater detail, typically the motion between the two configurations occurs by rotation of the second half-shell 2c with respect to the first half-shell 2b (or vice versa), wherein this rotation is indeed made possible by the hinge 9, which forms an axis of rotation that is parallel to the edges.

Figure 4:
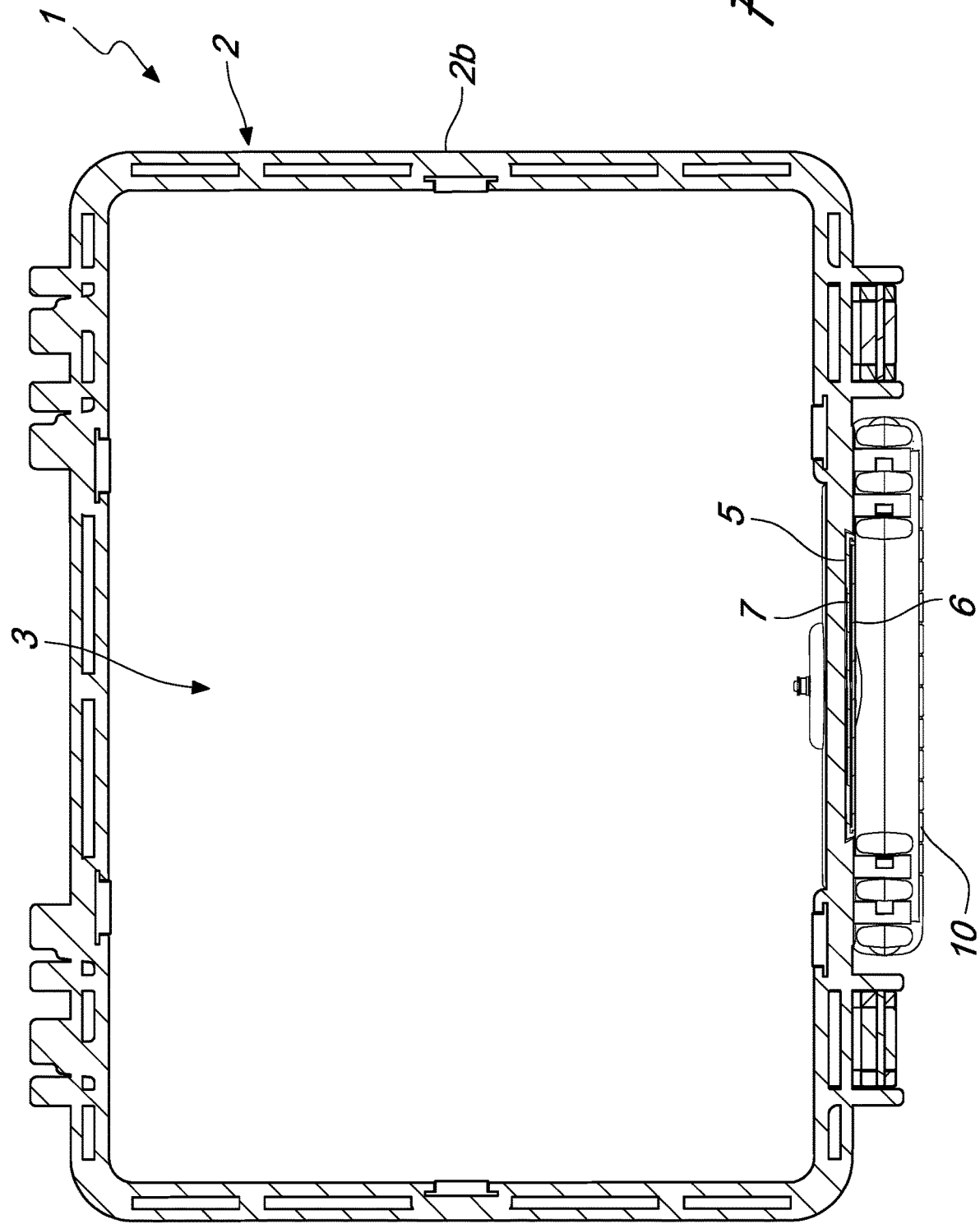
Figure 6:
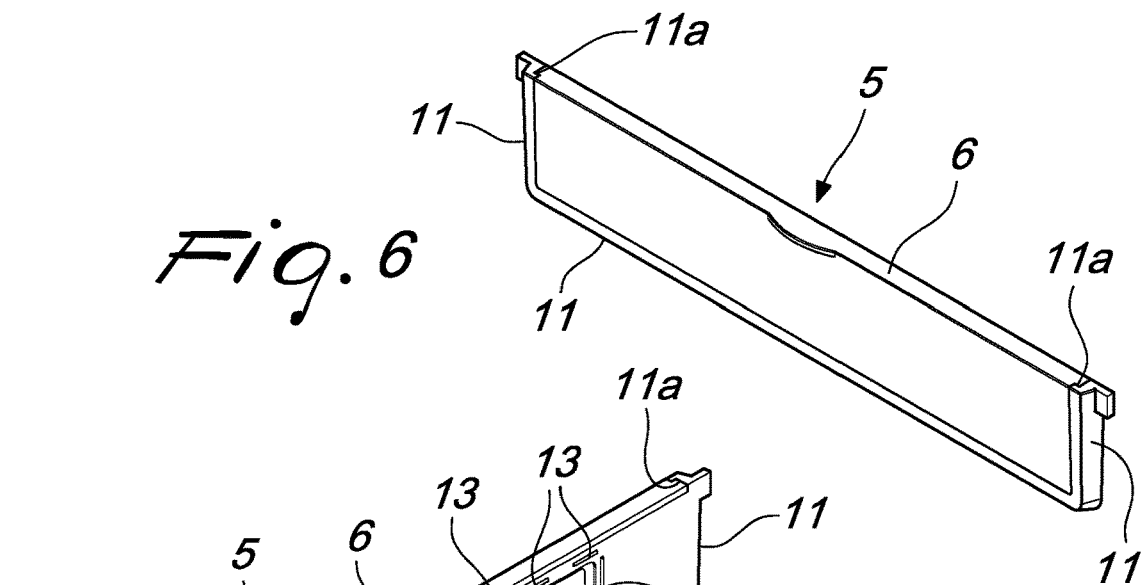
Figure 7:
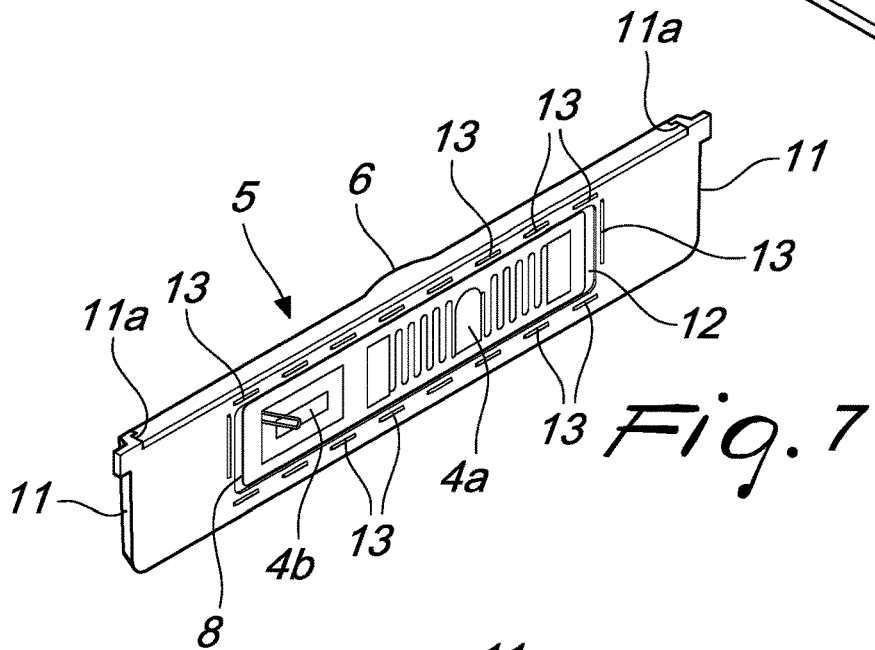
Figure 8:
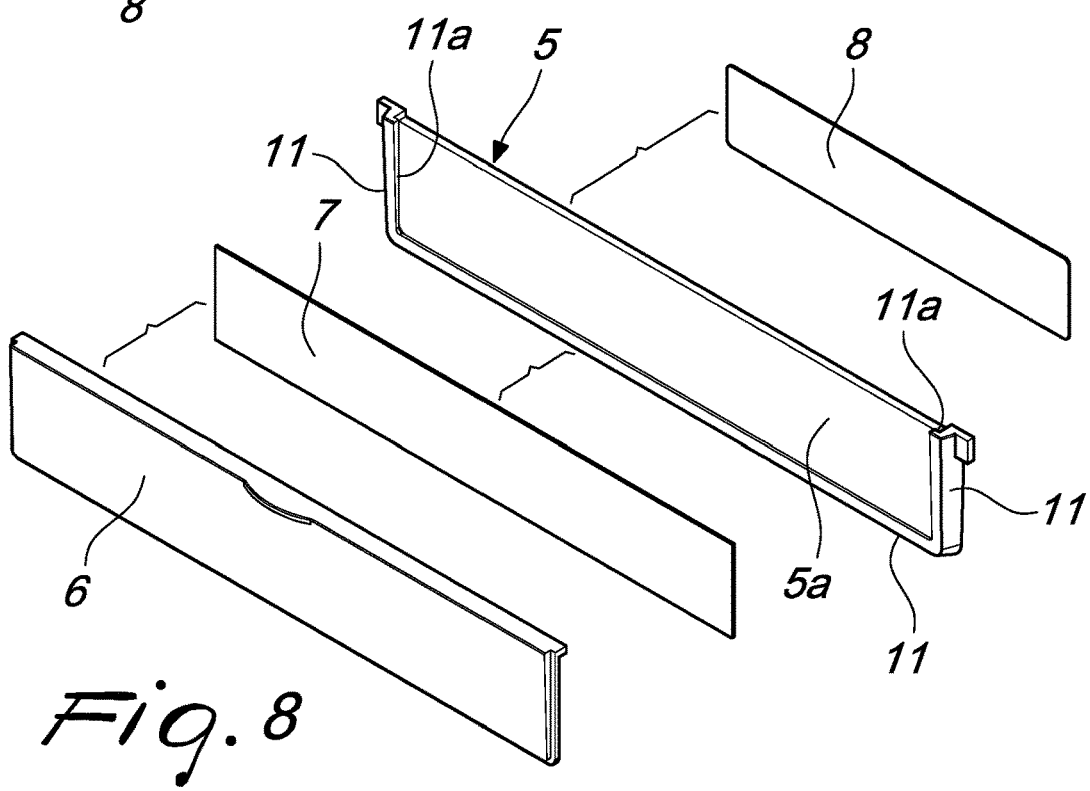
Figure 9:
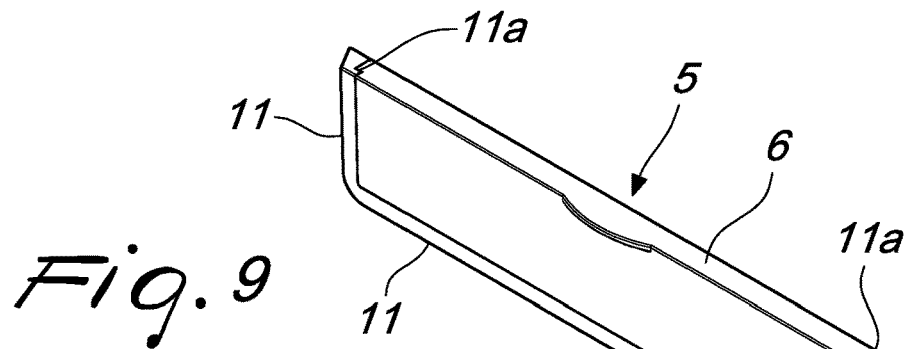
Figure 10:
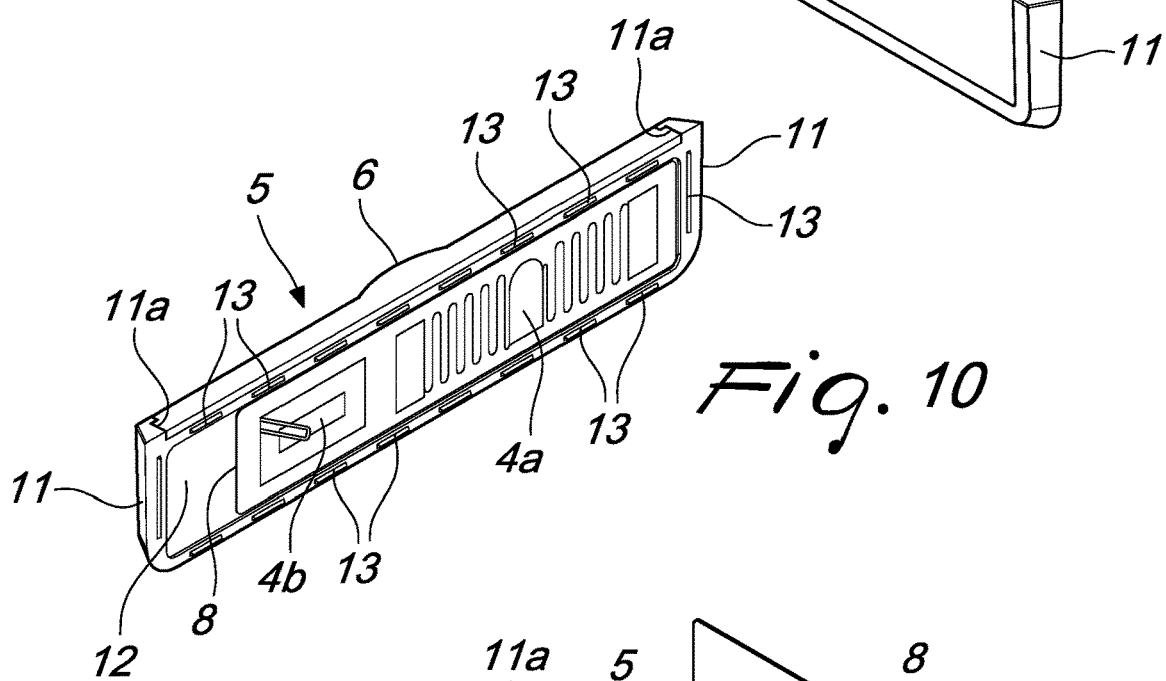
Figure 11:
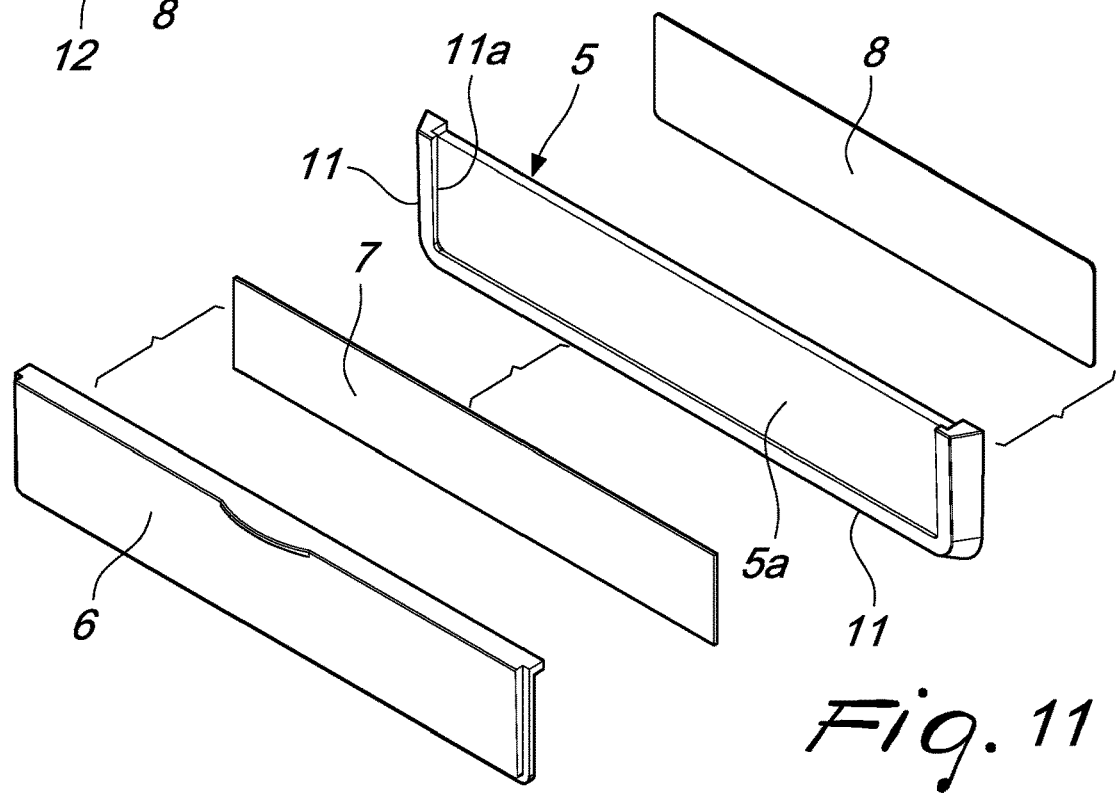
Figure 26:
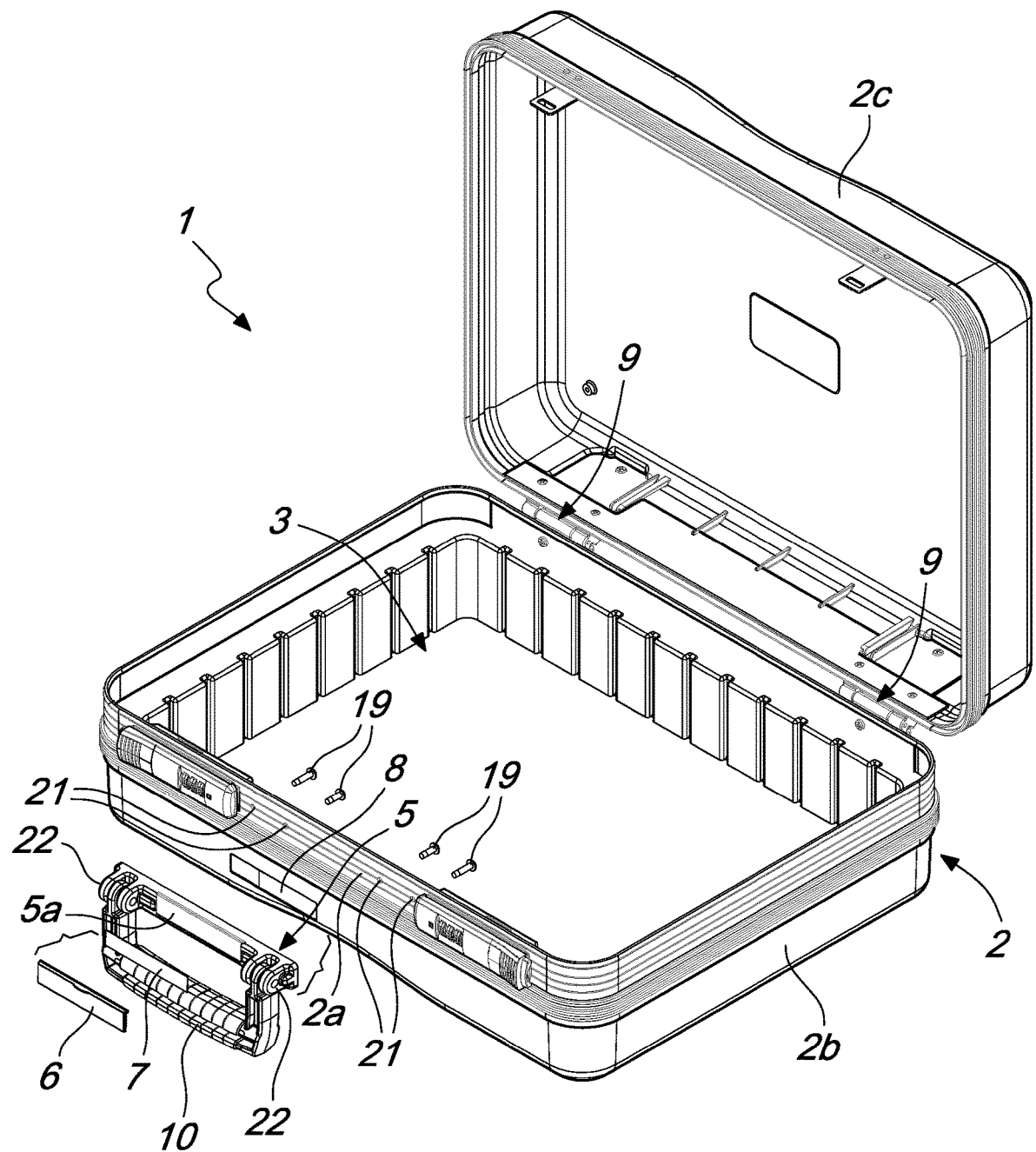
FIGS. 26 to 32 are views of the portable container according to the disclosure in the fourth embodiment, more particularly.
Figure 27:
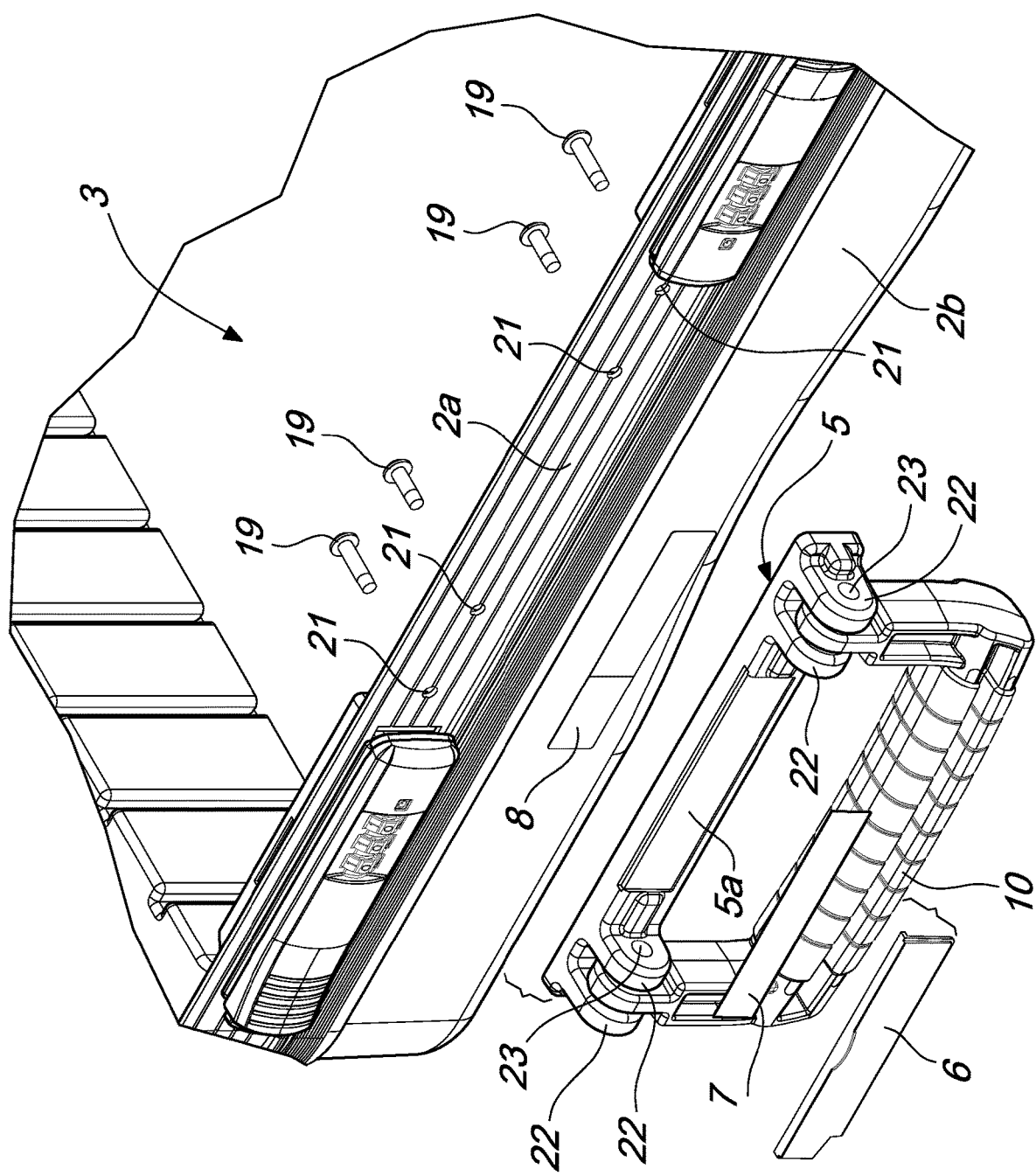
Figure 28:
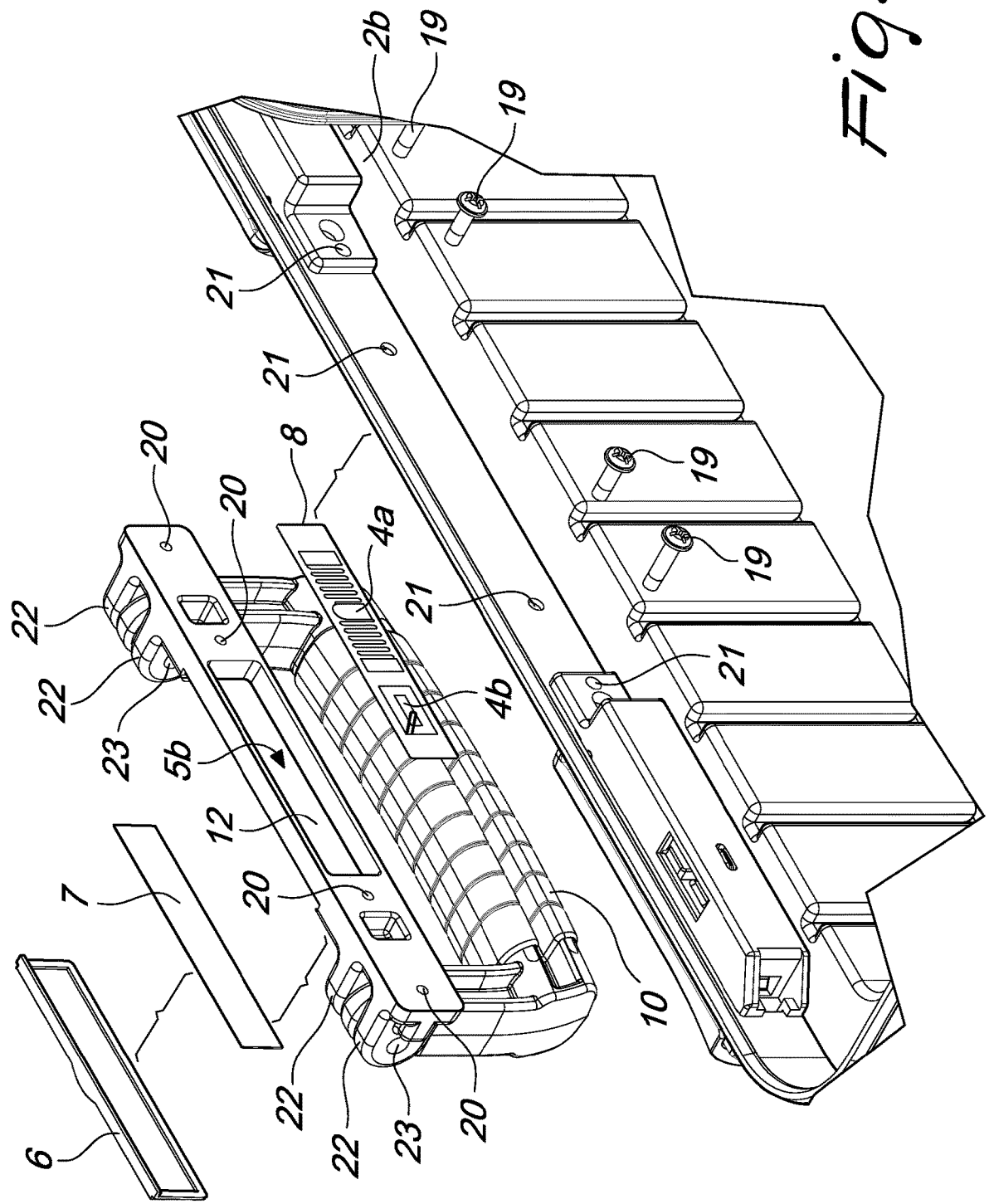
Figure 29:
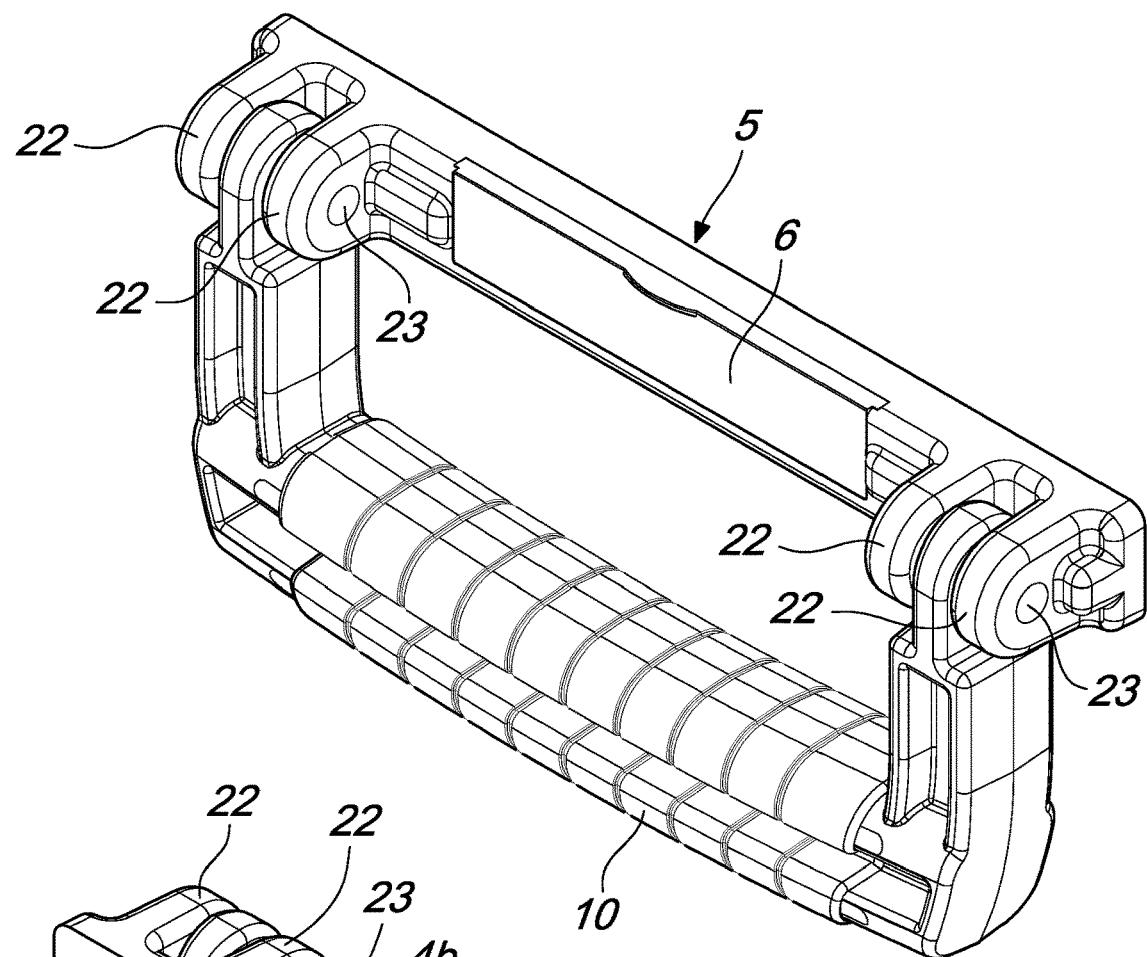
Figure 30:
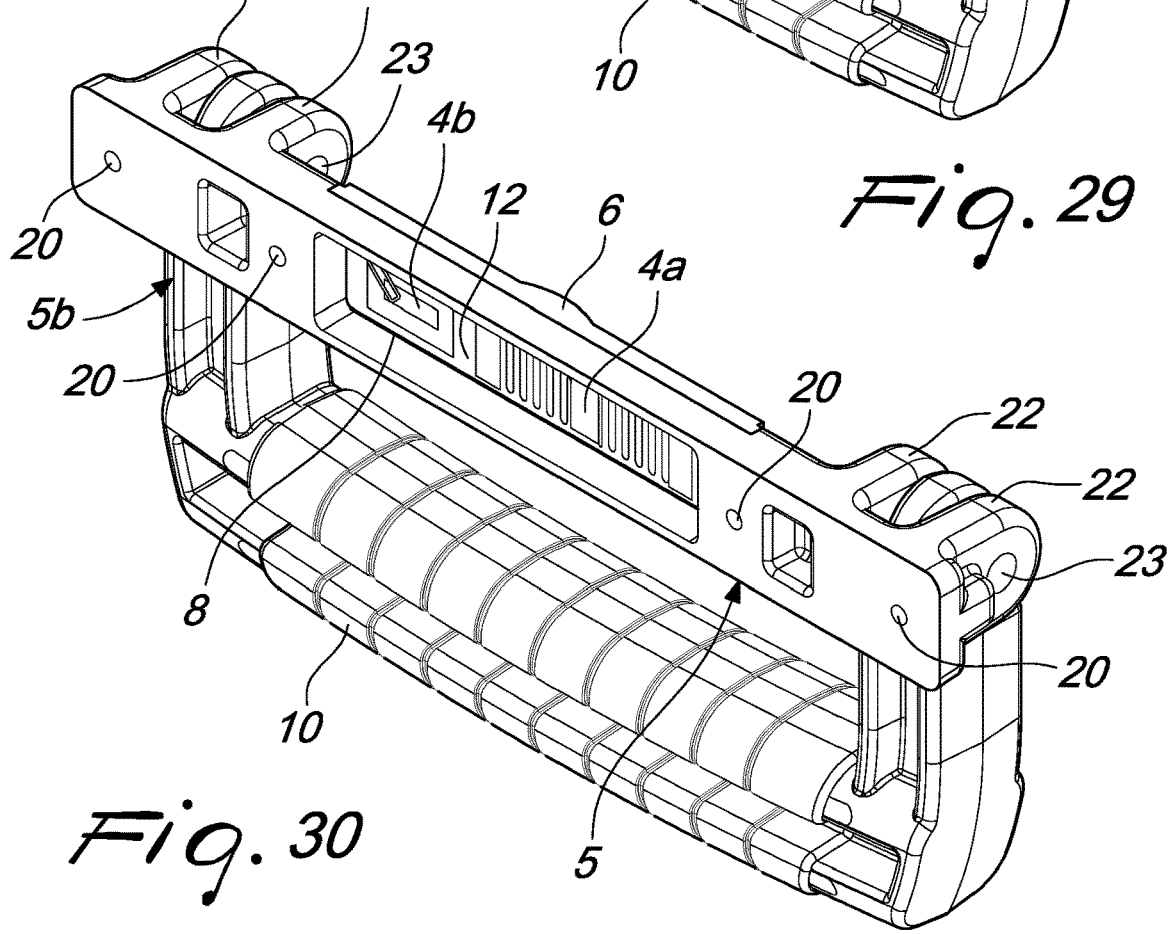
Figure 31:
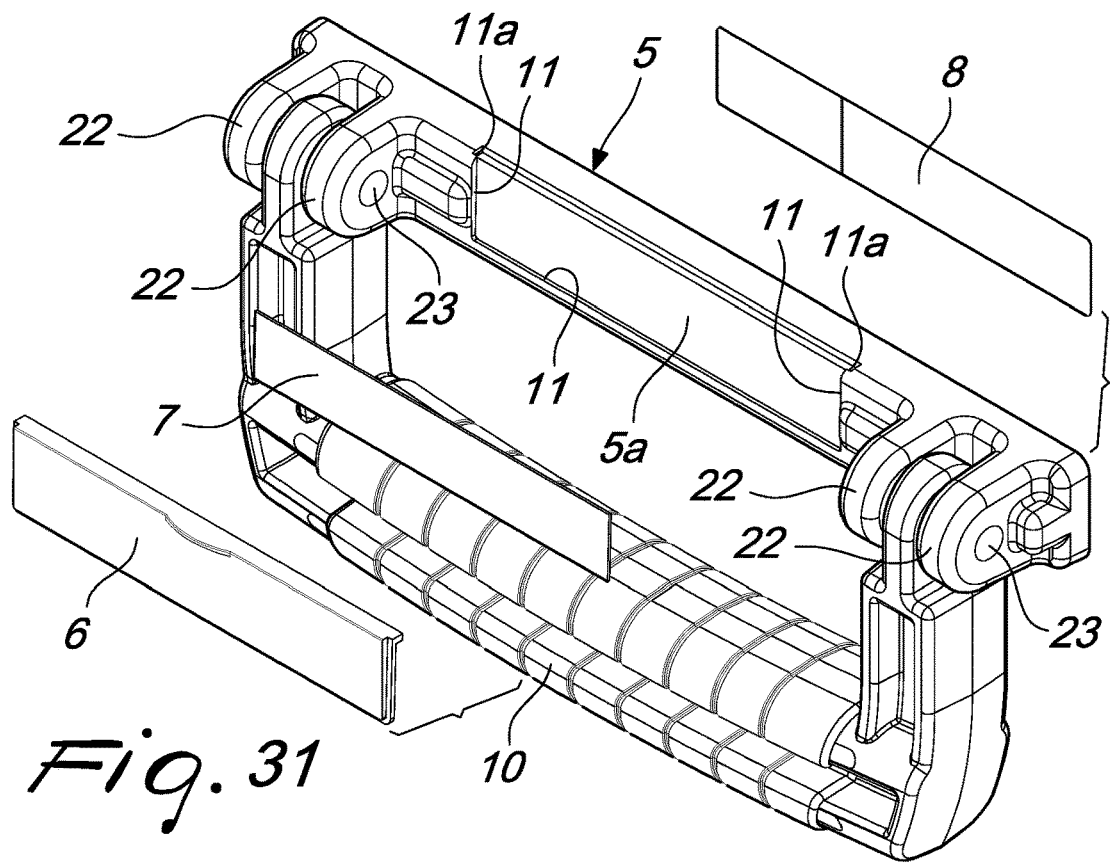
Figure 32:
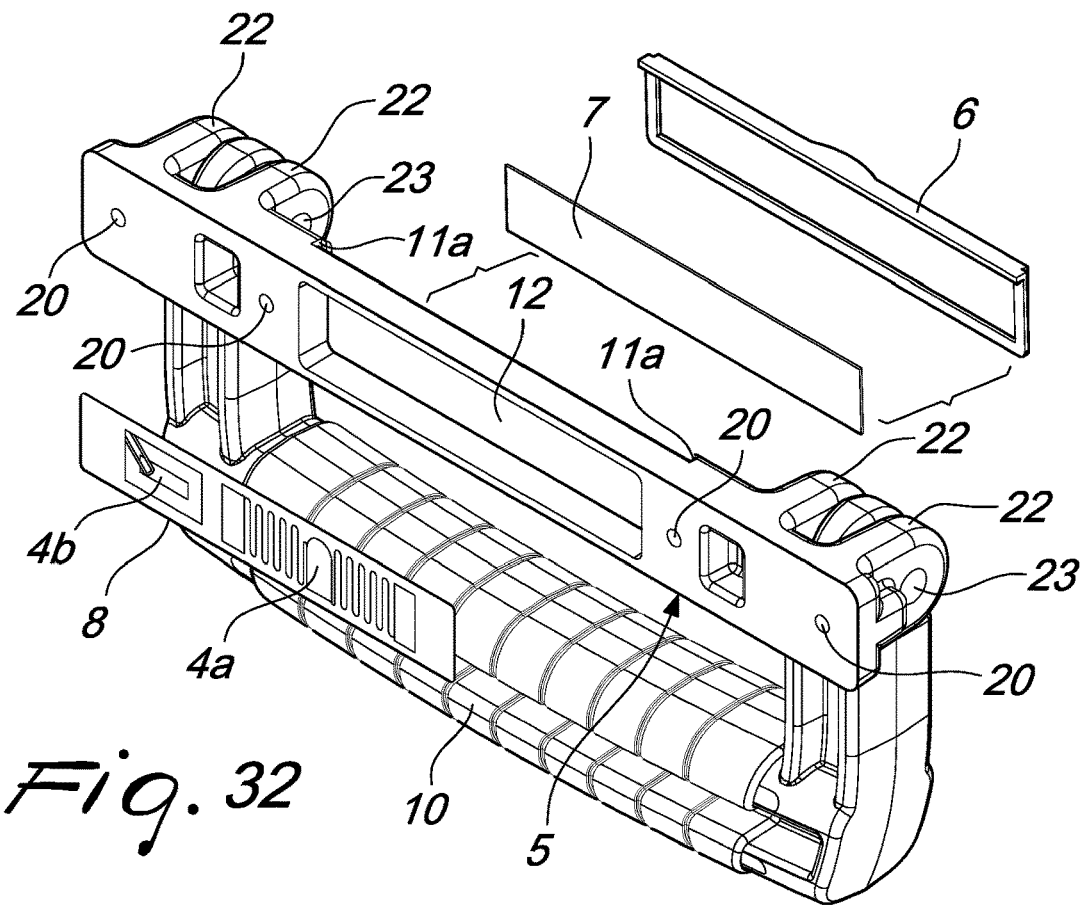

Even more particularly, the container 1 comprises at least one grip handle 10 (directly or indirectly) coupled to the shell 2 (preferably, the handle 10 will be articulated to the shell 2); the external surface region 2a, on which the plate 5 is anchored permanently, can be formed proximate to the handle 10 (as in the solutions of FIGS. 1-11 and 26-32). The handle 10 can in turn be placed in any point of the container 1, but preferably it is arranged on the opposite side with respect to the hinge 9, with the plate 5 that is indeed located proximate to it.

Figure 12:
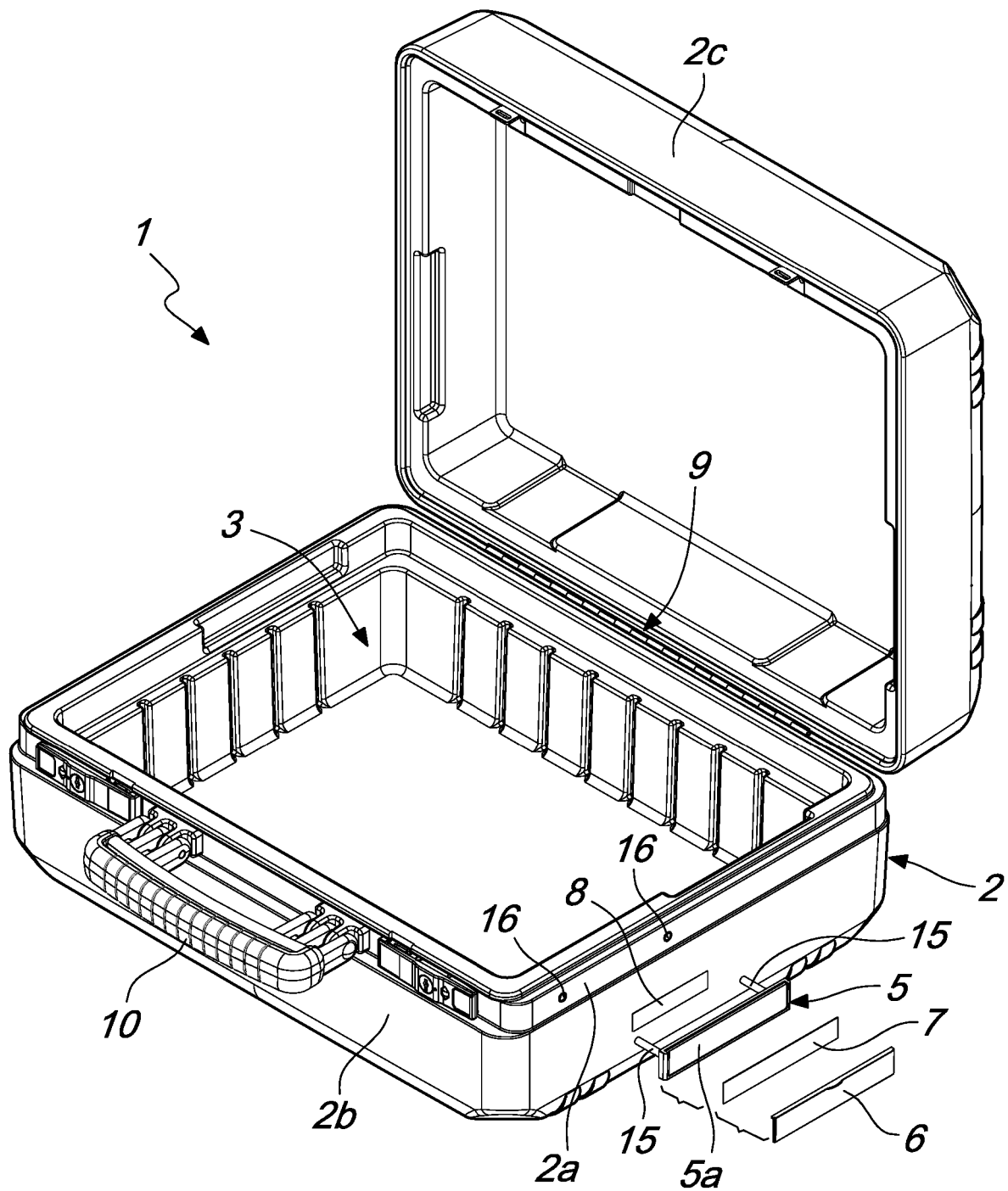
FIGS. 12 to 18 are views of the portable container according to the disclosure in the second embodiment, more particularly.
Figure 13:
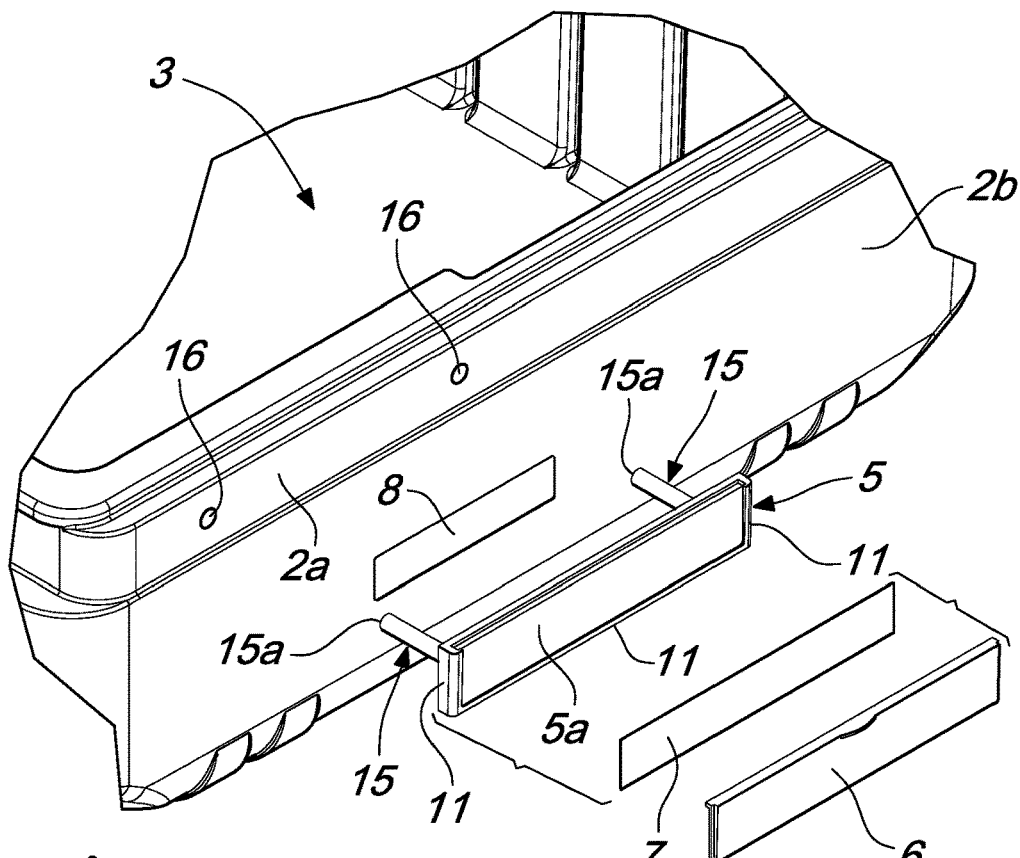
Figure 14:
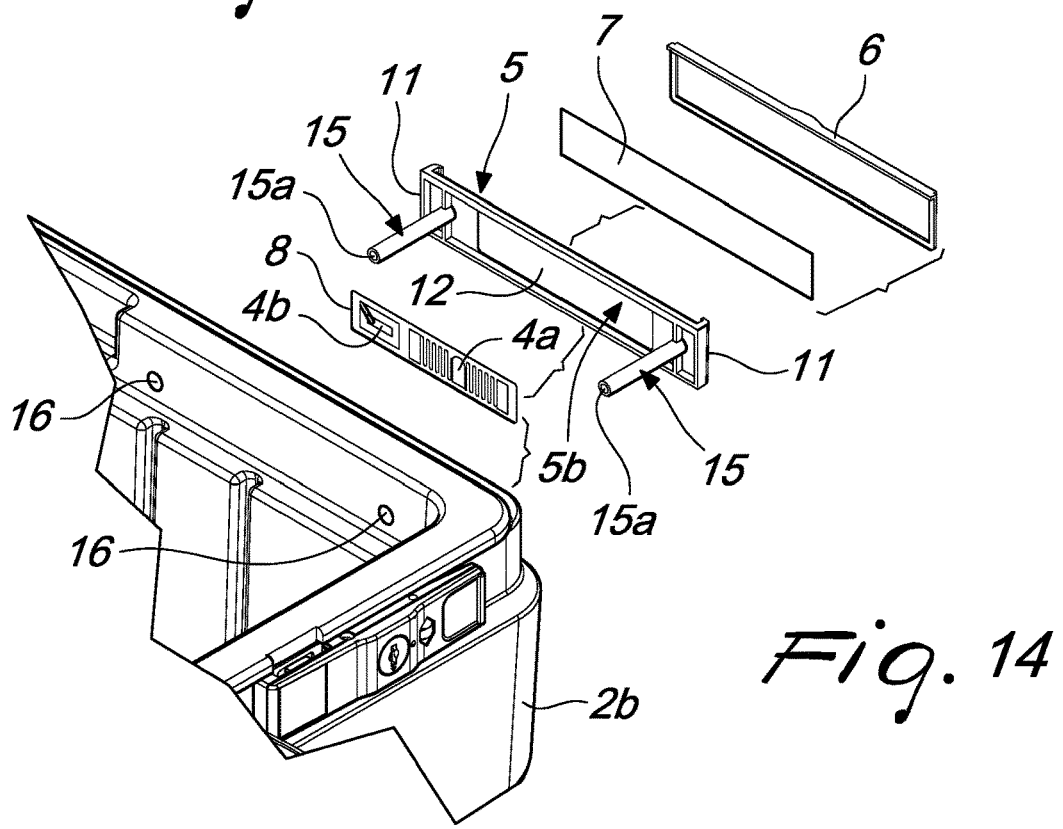
Figure 15:
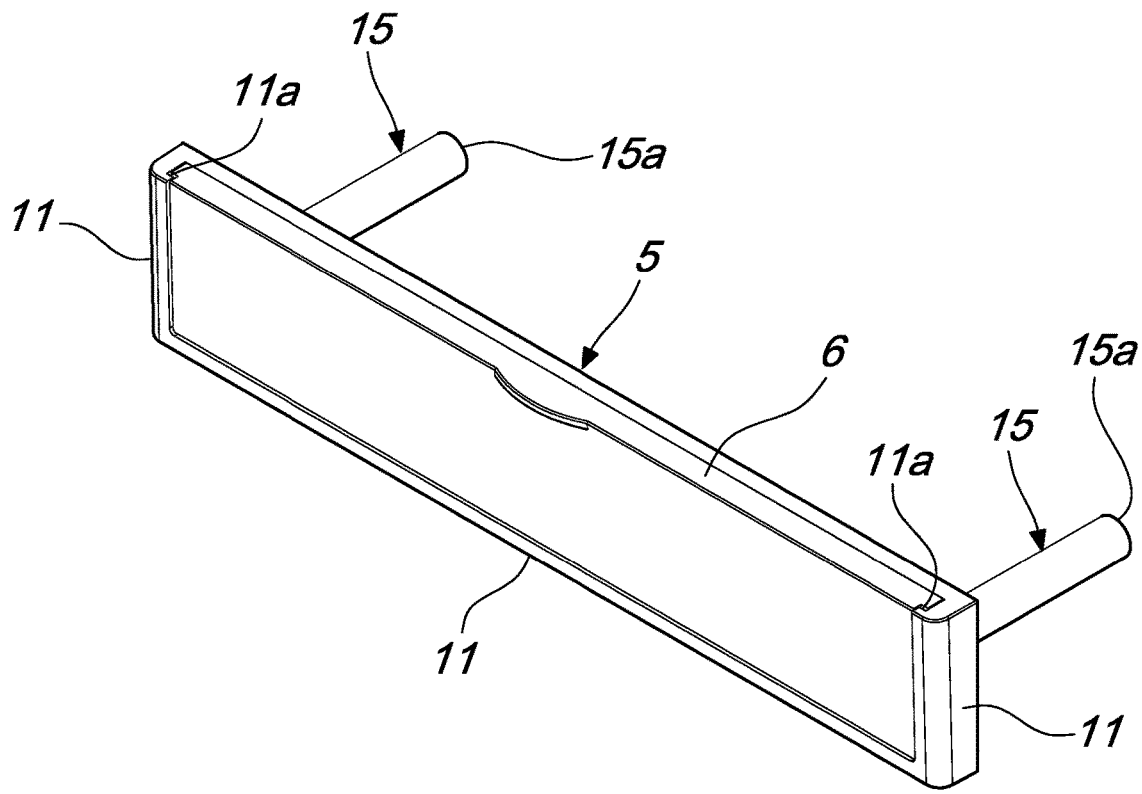
Figure 16:
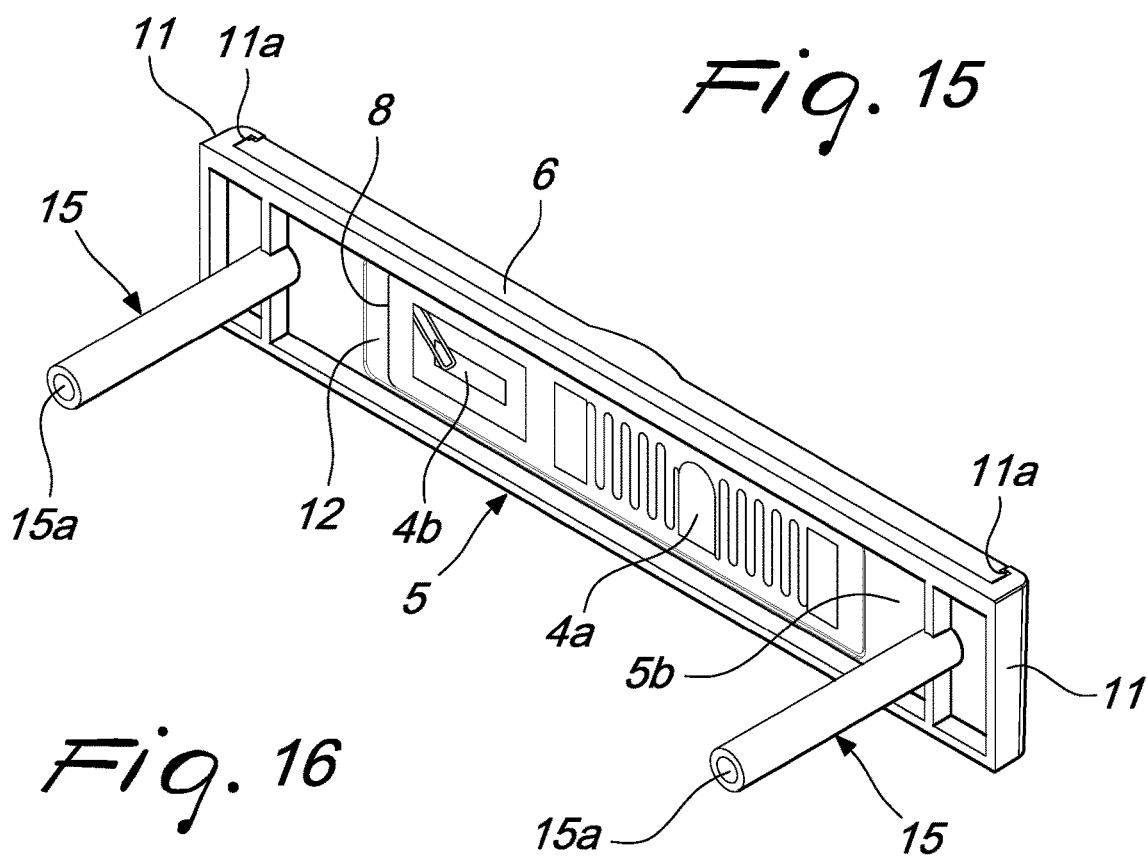
Figure 17:
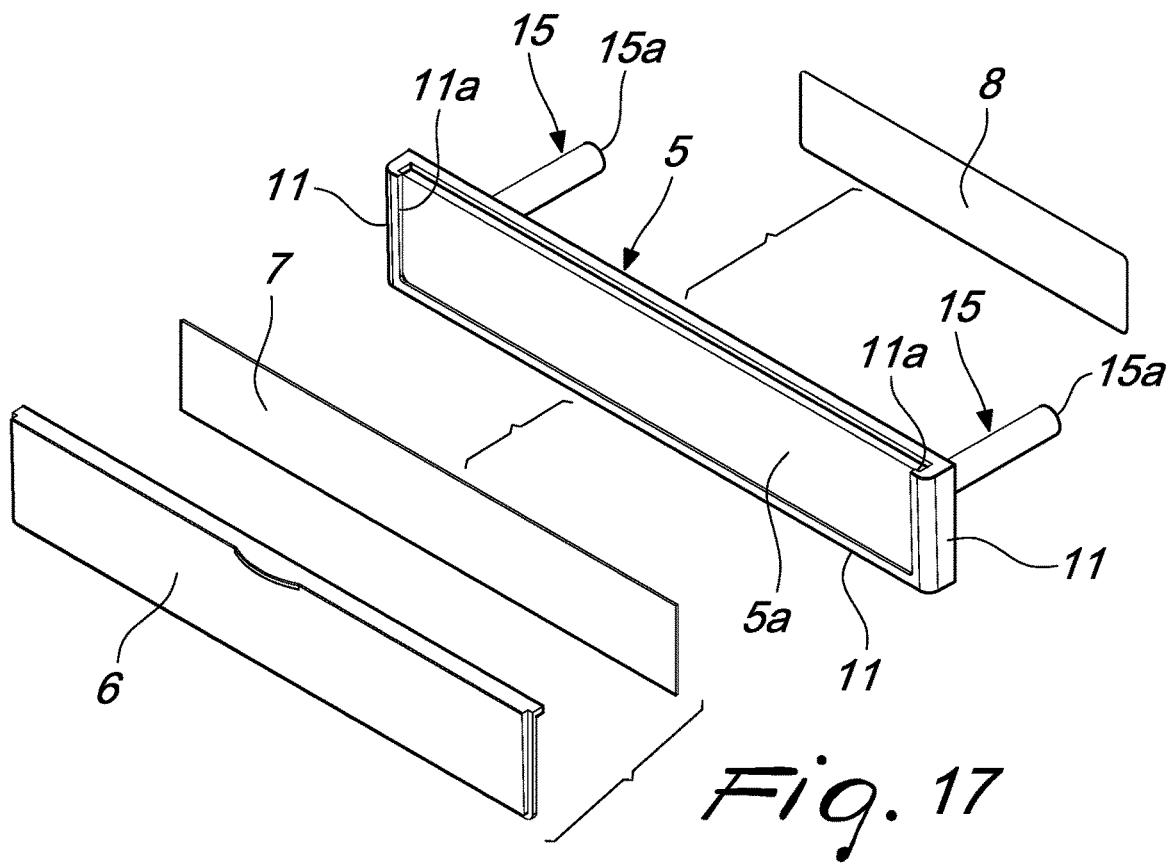
Figure 18:
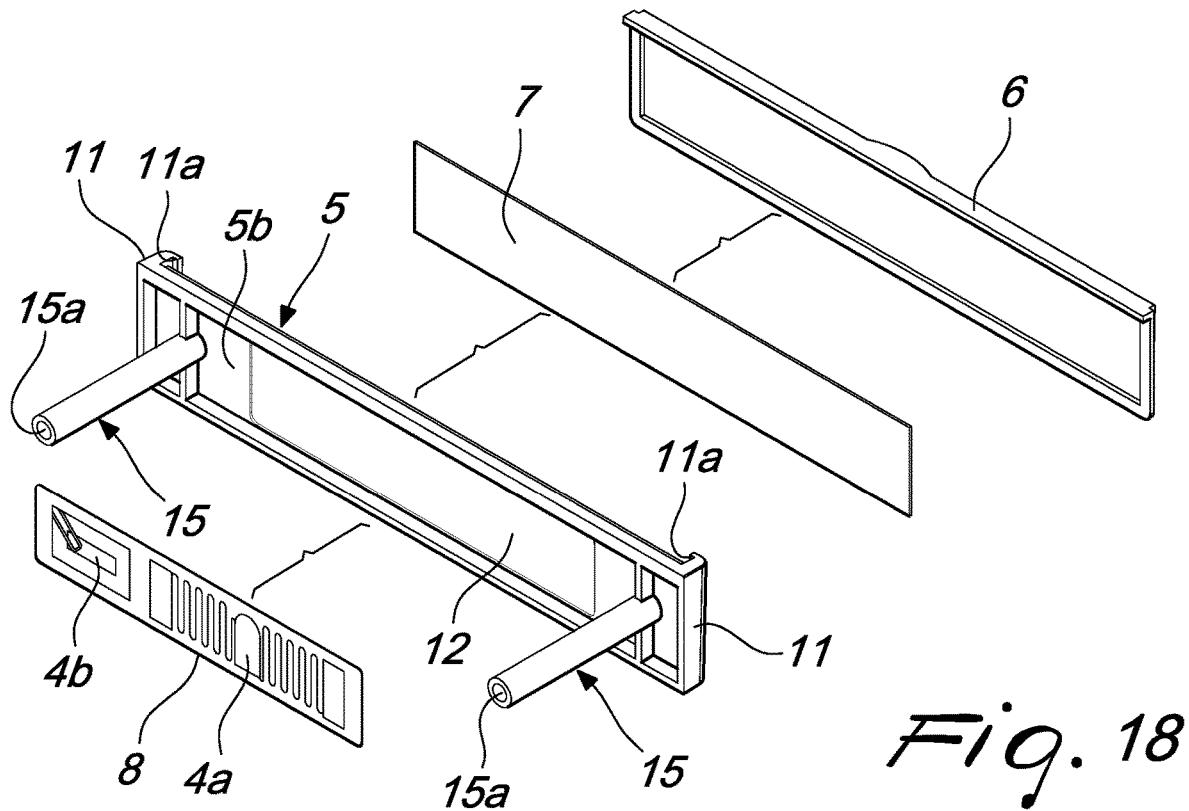
Figure 19:
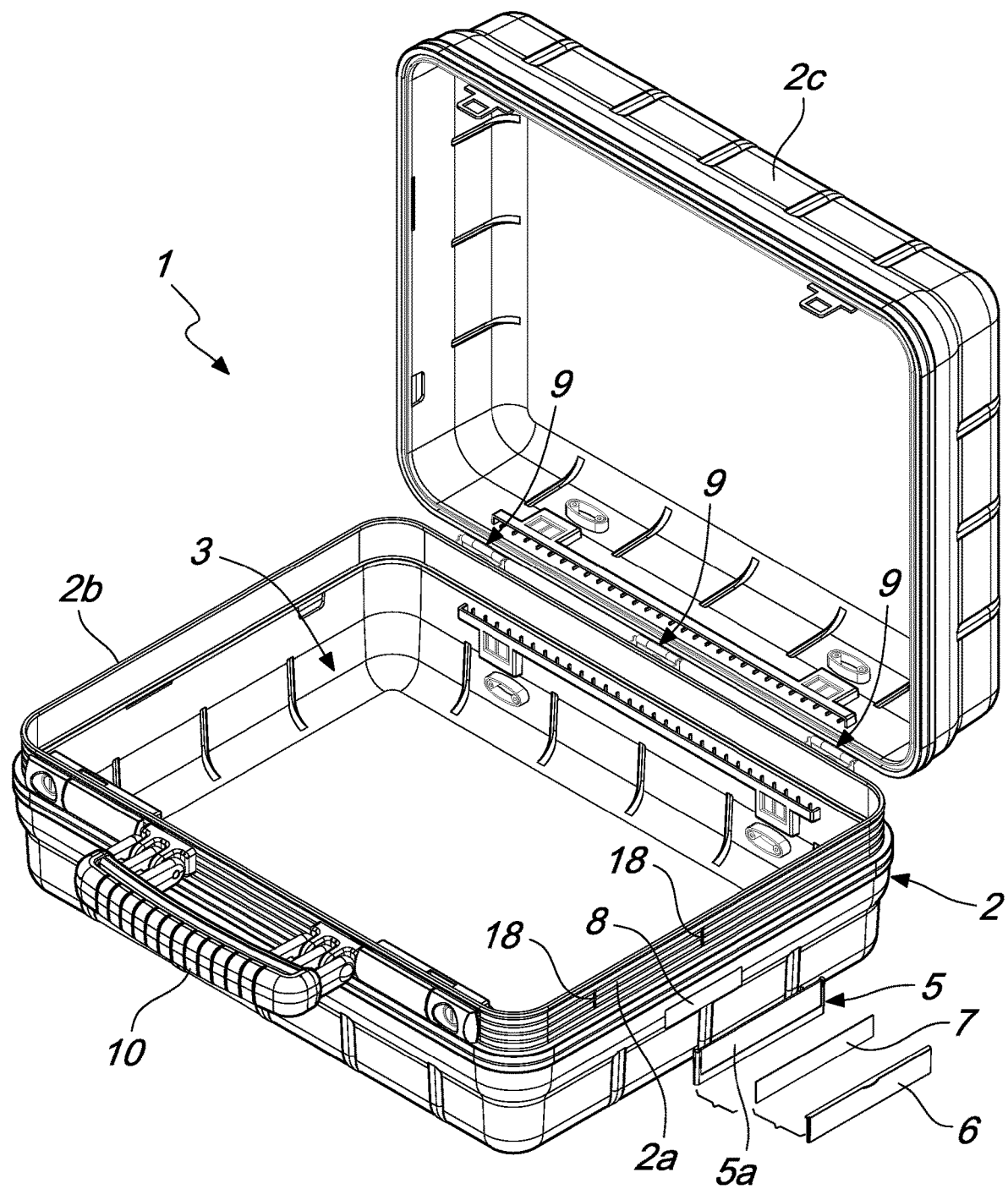
FIGS. 19 to 25 are views of the portable container according to the disclosure in the third embodiment, more particularly.
Figure 20:
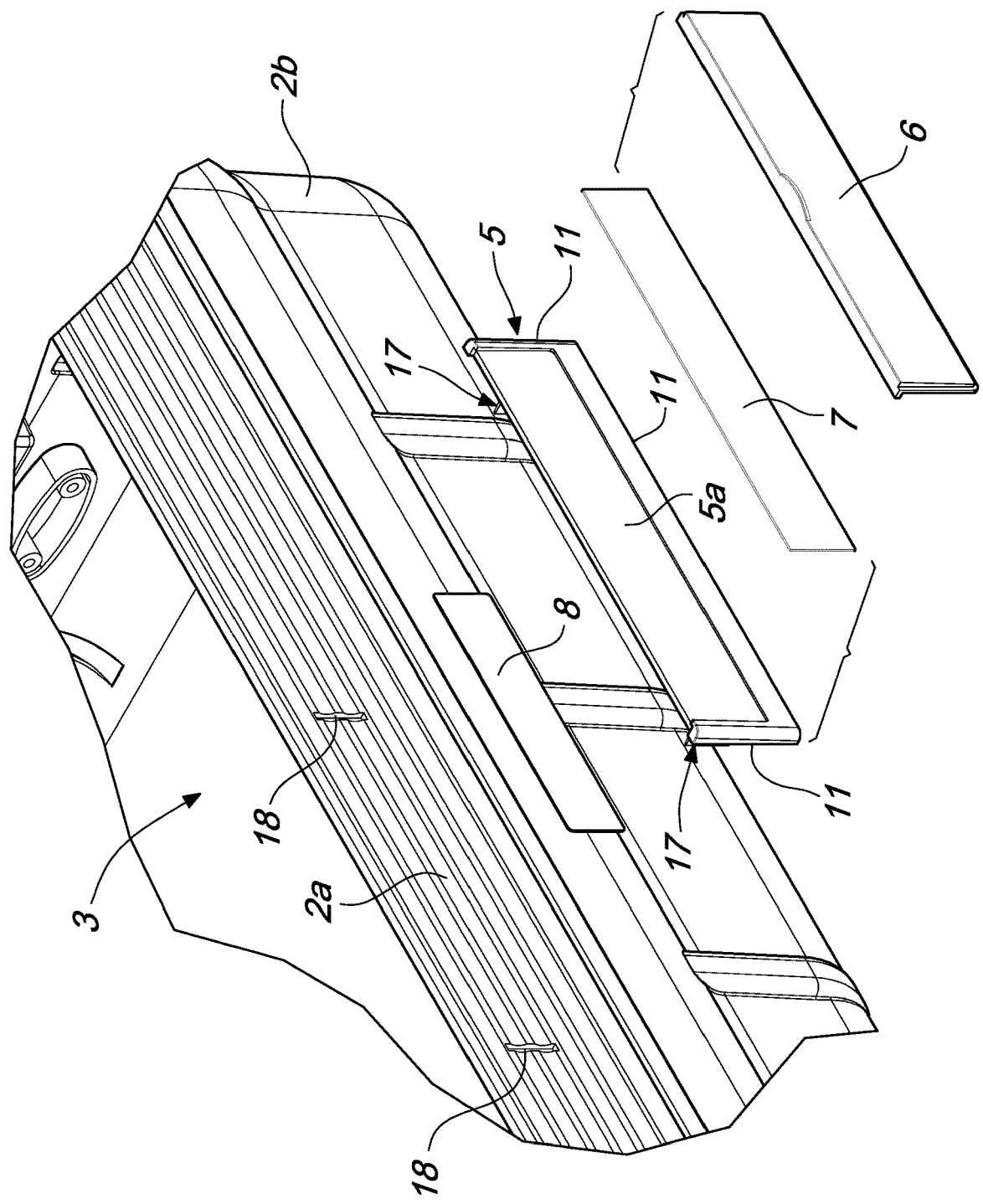
Figure 21:
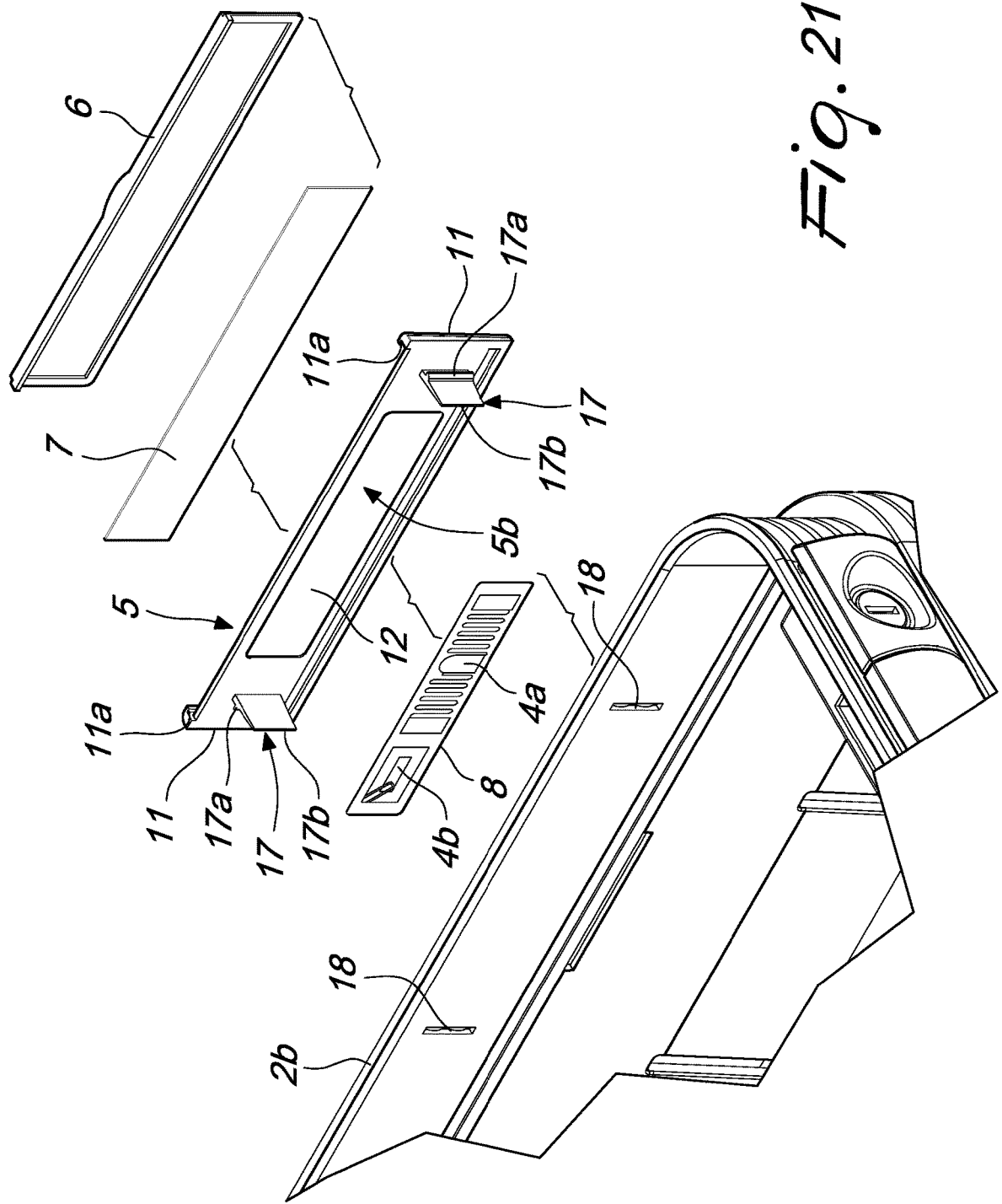
Figure 22:
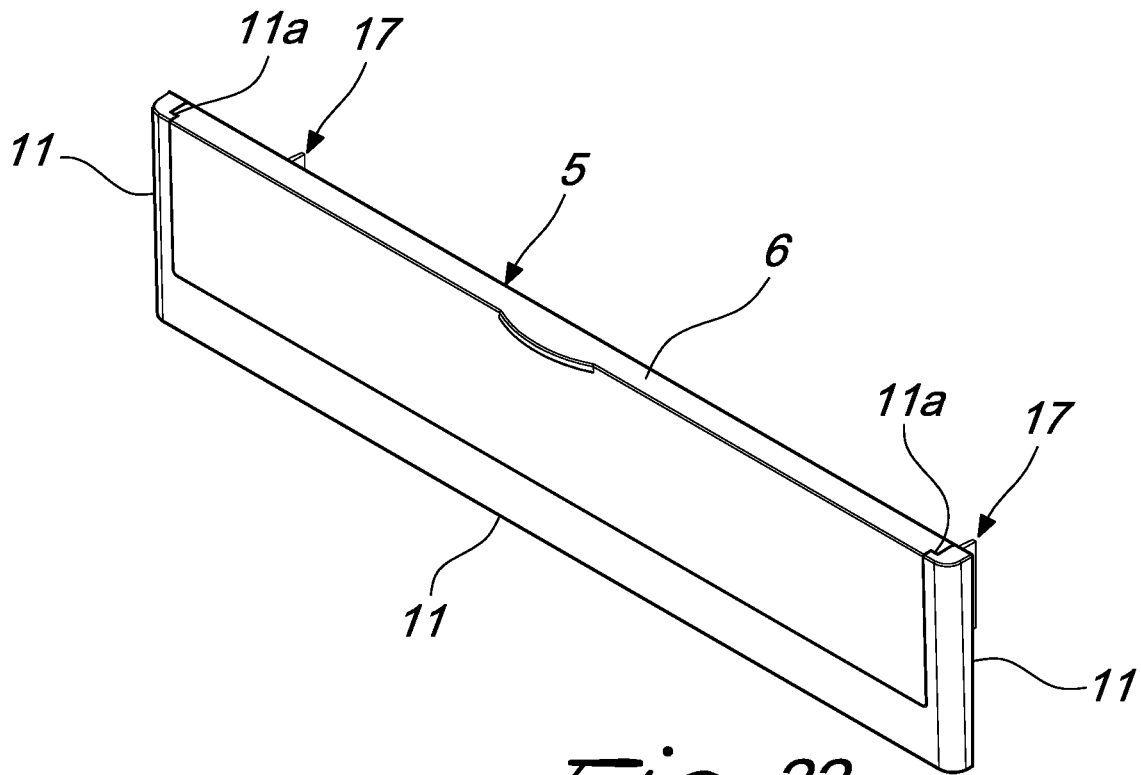
Figure 23:
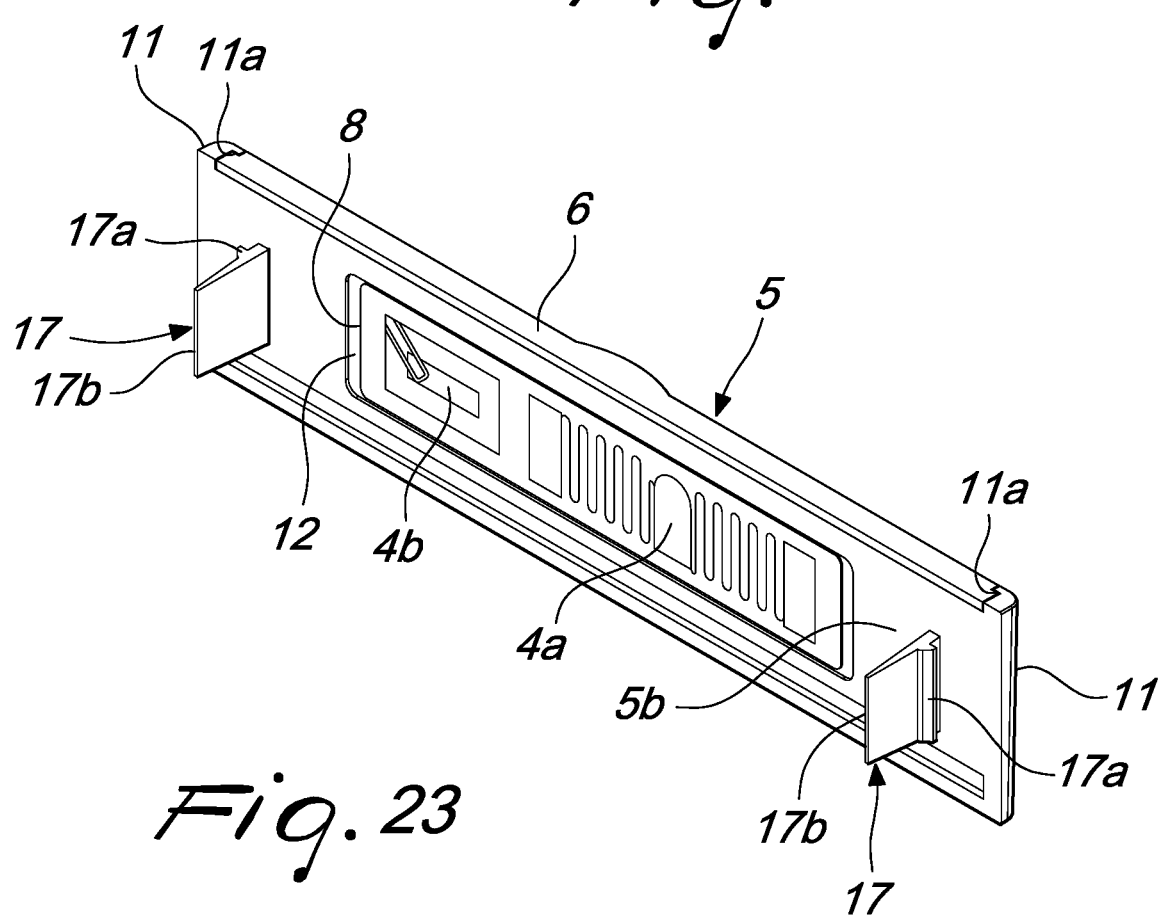
Figure 24:
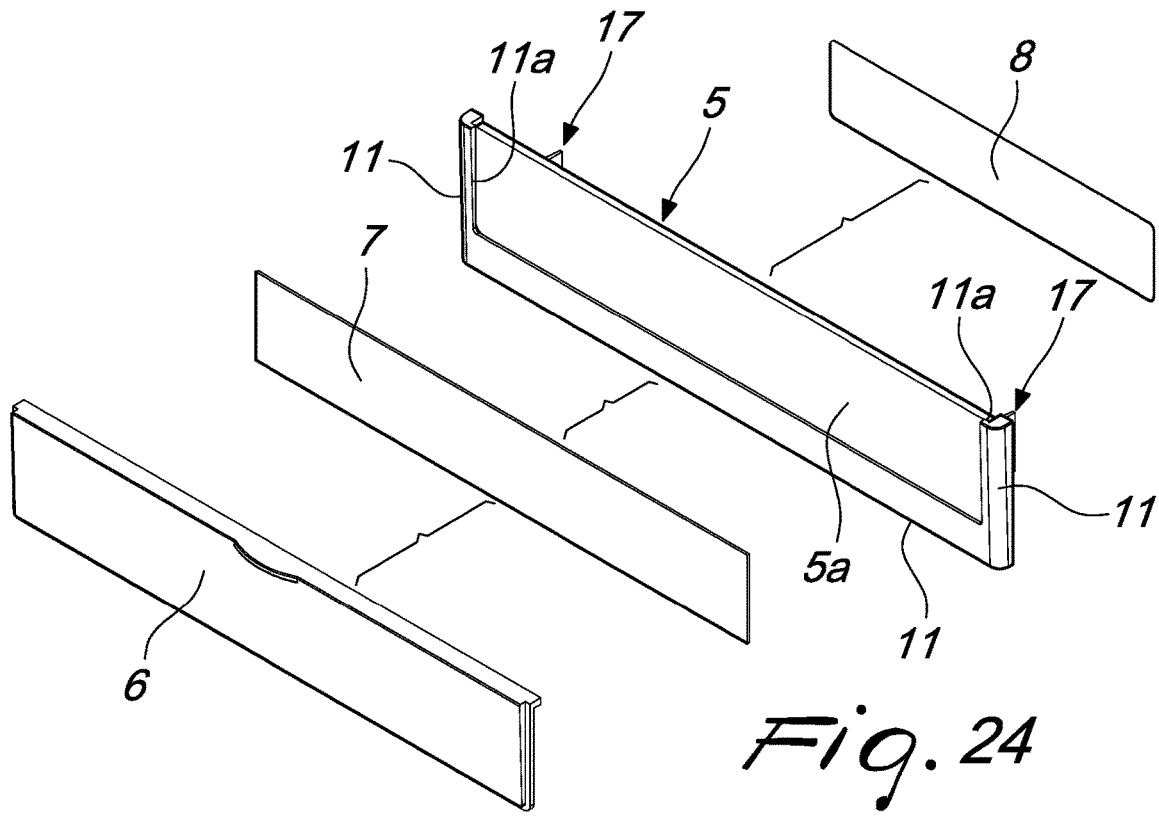
Figure 25:
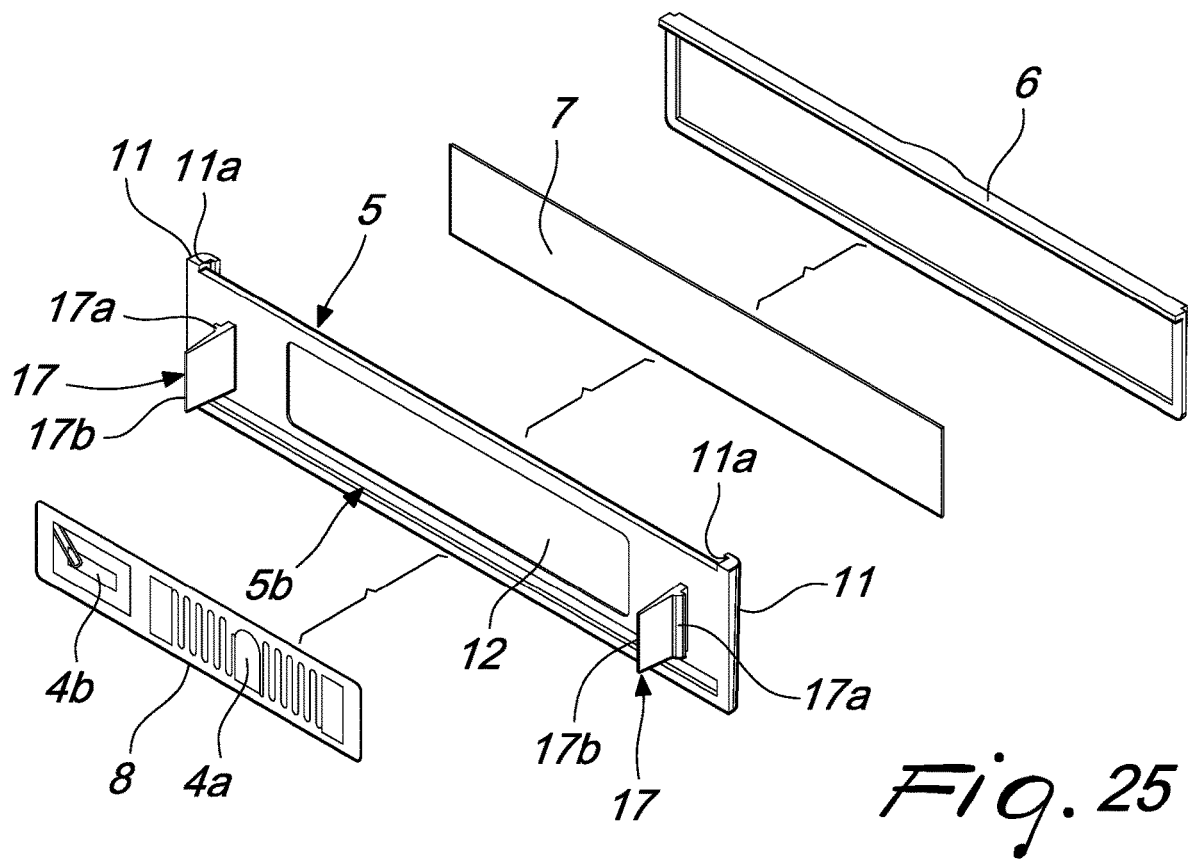

The region 2a is in any case on another wall of one of the half-shells 2a, 2b with respect to the one on which the handle 10 is fixed (such as for example in the solutions of FIGS. 12-18 and 19-25, in which the region 2a is provided on the wall that is adjacent to the one of the handle 10).

Usefully, the plate 5, which has a substantially rectangular shape, has at least one pair of perimetric raised side walls 11, which extend around the first face 5a from the mutually opposite shorter sides of the plate 5. The side walls 11 have respective mutually aligned undercuts 11a for facilitating the sliding and removable interlocking insertion of the plaque 6. The plaque 6 can thus be inserted progressively in the undercuts 11a, making it slide parallel to the first face 5a, until it is completely superimposed on the latter, completing the coupling. The element 7 can be inserted subsequently in the pocket that is formed, either before the sliding insertion, by resting it on the first face 5a or by making it adhere to the plaque 6. The shape of the undercuts 11a can be such as to form a dovetail coupling or a coupling of a different type. A third side wall 11 can furthermore be provided on a third side of the plate 5, opposite the insertion side, so as to form a stroke limiter for sliding insertion.

Advantageously, the second face 5b of the plate 5 has a recessed surface, which thus forms an accommodation seat 12 for the tag 4a, 4b (or the tags 4a, 4b). It is specified that each tag 4a, 4b may be applied directly on the seat 12, for example by gluing, or the seat 12 may accommodate the sheet 8, optionally chosen of a shape that matches the shape of said seat 12.

The methods with which the plate 5 is anchored to the external surface region 2a may be any, as a function of the specific requirements, without thereby abandoning the protective scope claimed herein. Some practical examples of considerable practical interest are provided in the paragraphs that follow, and in the accompanying figures, thus merely by way of non-limiting example.

In the constructive solution of FIGS. 1-11, the plate 5 is welded permanently to the region 2a at a plurality of welding spots, distributed around the seat 12. The step of production of the plate 5 (by molding or in another manner) entails in fact the possibility to provide it with teeth 13 of pyramid-like shape or of another type, distributed indeed around the seat 12. These teeth 13 can for example have a height equal to few tenths of a millimeter (preferably 0.4 mm) and a maximum transverse dimension comprised between 5 and 11.2 mm. During the step of assembly of the plate 5 to the shell 2, the plate 5 can be arranged in a recess 14 provided on the shell 2, at the external surface region 2a (the recess 14 is preferably placed proximate to the handle 10). After resting the plate 5 against the bottom of the recess 14, with the teeth 13 pressed against the shell 2, a welding device (provided for example with a sonotrode) can indeed act on the teeth 13 in order to provide the permanent anchoring of the plate 5 to the surface region 2a (the teeth 13 provide the materials for the cited welding spots).

It should be noted that this constructive solution is particularly suitable where it is necessary or preferable to ensure the integrity of the shell 2, thus avoiding resorting to perforations of any type on the latter in order to obtain the desired coupling. This is a solution that is appreciated where properties of insulation of the compartment 3 and of tightness of the container 1 are required, and where therefore any holes might facilitate the entry of water, humidity, dust and other foreign matter, indeed jeopardizing the possibility to obtain the desired functionalities.

In the constructive solutions that will be proposed hereinafter, instead (and which correspond to FIGS. 12-18, 19-25, 26-32), the anchoring is provided (also) by virtue of holes of various kinds along the shell 2.

More particularly, in a second constructive solution (FIGS. 12-18), the plate 5 has a pair of cylindrical posts 15 (but they might have a transverse cross-section of any type), which extend from the second face 5b and are inserted in respective circular holes 16 provided along the surface region 2a (with a center distance equal to that of the posts 15 and a diameter that is larger than the outside diameter of the posts). The plate 5 is welded permanently to the shell 2 at the free ends 15a of the posts 15, which protrude inside the shell 2.

During the assembly step, therefore, the posts 15 of the plate 5, provided previously, are inserted in the holes 16 until the second face 5b (carrying the tags 4a, 4b) rests against the surface region 2a. By virtue of a convenient sizing, after resting has occurred the posts 15 protrude from the profile of the shell 2, inside the compartment 3, and their ends 15a can thus be welded to said shell 2 (and optionally riveted on the latter), in order to improve the permanent anchoring of the plate 5 to the shell 2.

In a third constructive option (FIGS. 19-25), the plate 5 has a pair of mutually parallel ridges 17, which extend from the second face 5b (like the posts 15). The ridges 17 have, on respective sides, a transverse tooth 17a. The ridges 17 are inserted by elastic forcing in respective slits 18 provided along the surface region 2a, with the interlocking coupling of the teeth 17a in respective slots provided along the thickness of the shell 2 (or the teeth 17a can exit on the opposite side and prevent extraction anyway). The plate 5 is welded permanently to the shell 2 at the free tops 17b of the ridges 17, which protrude inside the shell 2.

In a manner similar to what has been observed for the previous constructive solution, during the assembly step the ridges 17 of the plate 5 provided previously, are inserted in the slits 18 until the second face 5b (provided with the tags 4a, 4b) rests against the surface region 2a. By virtue of an appropriate sizing, once resting has occurred the ridges 17 protrude at least by a few millimeters (for example six millimeters) from the profile of the shell 2, inside the compartment 3, and their tops 17b can thus be welded to said shell 2 (and optionally riveted on the latter), in order to complete the permanent anchoring of the plate 5 to the shell 2.

In a further constructive option (FIGS. 26-32), which does not exhaust the possibilities that in any case are within the protective scope claimed herein, the plate 5 is anchored to the region 2a by means of a plurality of permanent connecting elements 19, such as screws (self-tapping or not), nails, rivets, and the like. The elements 19 are inserted in respective orifices 20 provided along the plate 5 and in corresponding openings 21 provided along the shell 2.

With reference to the various embodiments introduced in the previous paragraphs, it should be stressed that recesses 14 and holes are sometimes already present or provided in commercially available containers (and in the molds that provide them), for example in order to couple thereto it simple (paper) label holders or accessories of another kind. In this case, therefore, it is possible to use the existing molds to produce containers 1 according to the disclosure, allowing the same manufacturing company to market products provided with the new and peculiar functionalities offered by the tags 4a, 4b with minimal adaptations and impact on the facilities and on the cycle for production and assembly.

Positively, in a possible practical solution, the first face 5a has at least one pair of protruding lugs 22, which are arranged at respective end portions of the plate 5. The lugs 22 have respective accommodation channels 23 for corresponding articulation pivots of the handle 10, which is therefore (indirectly) coupled to the shell 2 indeed by virtue of the plate 5 (with consequent and advantageous containment of the number of components in the bill of materials).

It should be noted that in the accompanying figures the lugs 22 are proposed only in relation to one of the various options shown: it is not excluded, in any case, to provide them for others among the ones shown or for yet others.

The use of the container according to the disclosure is thus evident from what has been observed so far.

The container 1 can be used according to traditional methods in order to store in the compartment 3 objects of any type, which the user can carry with him during trips of various kinds and for different purposes.

In the meantime, the presence of one or more electronic tags 4a, 4b offers diversified and always new possibilities of interaction with a subject provided with a reader, or in any case with an electronic device (fixed or mobile, even of a known type) indeed capable of interacting with the container 1 via a contactless information transmission technology, such as RFID, NFC, and similar technologies.

The electronic tags 4a, 4b are kept interposed between the region 2a and the second face 5b of the plate 5 (permanently anchored to the shell 2), and are therefore arranged in a position that is not accessible (except by causing severe damage to the container 1, which remains thus easily identifiable and thus immediately indicates tampering to the designated user). This placement thus discourages attempts at tampering and ensures suitable protection thereof.

At the same time, since each electronic tag 4a, 4b is located on the plate 5, placed outside the shell 2 and having typically a thickness of a few centimeters, when the designated RFID/NFC (or other) reader is moved closer to the container 1, the tag 4a, 4b is certainly within its operating range, and the shell 2 does not interfere in any way. Therefore, the chosen placement allows easy interaction with external readers.

More generally, by virtue of the disclosure an optimum placement is found for the tag 4a, 4b, ensuring on the one hand an easy interaction with other devices and on the other hand acting as a valid deterrent against attempts at tampering by malicious third parties.

It should be noted also that the plate 5 allows (on the opposite side with respect to the tags 4a, 4b) the introduction of identification elements 7 in the pocket formed between the first face 5a and the plaque 6: therefore, the component (indeed the plate 5) that carries the tags 4a, 4b is the same one that carries the element 7, with containment of the overall number of components. Moreover, often known containers are already designed and built for receiving label holder accessories (or others), and it is therefore possible to use the provisions that are present (optionally with minimal adaptations) to assemble the plate 5 on them, thus making them conform to the disclosure.

The chosen placement therefore allows easy assembly, even by providing simple modifications to facilities and processes for producing existing or already commercially available containers.

The disclosure thus conceived is susceptible of numerous modifications and variations, all of which are within the scope of the appended claims; all the details may furthermore be replaced with other technically equivalent elements. In the examples of embodiment shown, individual characteristics, given in relation to specific examples, may actually be replaced with other different characteristics that exist in other examples of embodiment.

In practice, the materials used, as well as the dimensions, may be any according to the requirements and the state of the art.

The disclosures in Italian Patent Application No. 102018000010999 from which this application claims priority are incorporated herein by reference.

The invention claimed is:

1. A portable container comprising an outer shell for delimiting at least one compartment for accommodating personal items, instruments, tools, objects in general, and at least one electronic tag configured to store data of various kinds and/or transmit them via a contactless information transmission technology, such as RFID, NFC and similar technologies, the portable container further comprising a supporting plate anchored permanently to an external surface region of said shell, an at least partially transparent plaque being arranged on a first face of said supporting plate, said first face of said supporting plate being outwardly facing and arranged on an opposite side of said supporting plate with respect to said external surface region, said plaque being interlocked to said supporting plate in a parallel and detachable manner, a pocket being formed between said supporting plate and said plaque configured to receive identification elements, said at least one tag being fixed stably on a second face of said supporting plate, said second face of said supporting plate being inwardly facing and opposite with respect to said first face and is anchored permanently to said external surface region of said shell, wherein said at least one tag is arranged interposed between said external surface region of said shell and said second face of said supporting plate anchored permanently to said external surface region of said shell.

2. The portable container according to claim 1, further comprising a first said electronic tag and a second said electronic tag, both of said tags being fixed stably on an adhesive sheet which is applied to said second face of said supporting plate.

3. The portable container according to claim 1, further comprising at least one said identification element, which is preprinted and/or manually writable, said identification element being inserted removably in said pocket, between said first face of said supporting plate and said plaque.

4. The portable container according to claim 1, wherein said shell comprises a first half-shell and a second half-shell having a substantially open configuration, which are mutually articulated about at least one hinge which is arranged proximate to a common edge, said half-shells being mutually movable between at least one configuration for free access to said compartment and a configuration for the closure of said compartment, wherein the respective free edges of said half-shells are fully superimposed, said external surface region being formed on one of said half-shells, proximate to one of said edges.

5. The portable container according to claim 1, further comprising at least one grip handle, which is coupled to said shell, said external surface region being formed proximate to said handle.

6. The portable container according to claim 5, wherein said first face is provided with at least one pair of protruding lugs, which are arranged at respective end portions of said supporting plate and form respective accommodation channels for corresponding articulation pivots of said grip handle.

7. The portable container according to claim 1, wherein said supporting plate, which has a substantially rectangular shape, has at least one pair of perimetric raised side walls, which extend around said first face from mutually opposite shorter sides of said supporting plate, said side walls having respective mutually aligned undercuts for the sliding and removable interlocking insertion of said plaque.

8. The portable container according to claim 1, wherein said second face is provided with a recessed surface, which forms an accommodation seat for said at least one tag.

9. The portable container according to claim 1, wherein said supporting plate is welded permanently to said external surface region at a plurality of welding spots, which are distributed around said seat.

10. The portable container according to claim 1, wherein said supporting plate has a pair of cylindrical posts, which extend from said second face and are inserted in respective circular holes provided along said external surface region, said plate being welded permanently to said shell at free ends of said posts, which protrude inside said shell.

11. The portable container according to claim 1, wherein said supporting plate is anchored to said external surface region by a plurality of permanent connecting elements inserted in respective orifices provided along said plate and in corresponding openings provided along said shell.

12. A portable container comprising an outer shell for delimiting at least one compartment for accommodating personal items, instruments, tools, objects in general, and at least one electronic tag configured to store data of various kinds and/or transmit them via a contactless information transmission technology, such as RFID, NFC and similar technologies, the portable container further comprising a supporting plate anchored permanently to an external surface region of said shell, an at least partially transparent plaque being arranged on a first face of said supporting plate, said first face of said supporting plate being arranged on an opposite side of said supporting plate with respect to said external surface region, said plaque being interlocked to said supporting plate in a parallel and detachable manner, a pocket being formed between said supporting plate and said plaque configured to receive identification elements, said at least one tag being fixed stably on a second face of said supporting plate, which is opposite with respect to said first face and is applied stably to said external surface region of said shell, wherein said supporting plate has a pair of mutually parallel ridges, which extend from said second face and have, on respective sides, a transverse tooth, said ridges being inserted by elastic forcing in respective slits provided along said external surface region, with the interlocking coupling of said teeth in respective slots provided along the thickness of said shell, said supporting plate being welded permanently to said shell at free tops of said ridges, which protrude within said shell.

* * * * *